(12) United States Patent
Batres et al.

(10) Patent No.: US 10,239,173 B2
(45) Date of Patent: Mar. 26, 2019

(54) CUTTING APPARATUS

(71) Applicant: James Hardie Technology Limited, Dublin (IE)

(72) Inventors: Benjamin Batres, Fontana, CA (US); Sam Kenneth LaBanco, Chicago, IL (US); Basil Naji, Upland, CA (US); Gary Frank Prokop, Chicago, IL (US); William Edwin Venth, Chicago, IL (US); Matthew Spencer, Palatine, IL (US)

(73) Assignee: James Hardie Technology Limited, Dublin (IE)

( * ) Notice: Subject to any disclaimer, the term of this patent is extended or adjusted under 35 U.S.C. 154(b) by 490 days.

(21) Appl. No.: 14/775,491

(22) PCT Filed: Mar. 11, 2014

(86) PCT No.: PCT/EP2014/054756
§ 371 (c)(1),
(2) Date: Sep. 11, 2015

(87) PCT Pub. No.: WO2014/140052
PCT Pub. Date: Sep. 18, 2014

(65) Prior Publication Data
US 2016/0016270 A1    Jan. 21, 2016

Related U.S. Application Data

(60) Provisional application No. 61/776,338, filed on Mar. 11, 2013.

(51) Int. Cl.
*B01D 46/00*    (2006.01)
*B01D 46/52*    (2006.01)
(Continued)

(52) U.S. Cl.
CPC ...... *B23Q 11/0046* (2013.01); *B01D 46/0002* (2013.01); *B01D 46/521* (2013.01); *B23D 59/006* (2013.01); *B23Q 11/0071* (2013.01)

(58) Field of Classification Search
CPC ............ B23Q 11/0042; B23Q 11/0046; B23Q 11/006; B23Q 11/0071; B23D 59/00; B23D 59/006
(Continued)

(56) References Cited

U.S. PATENT DOCUMENTS 4,192,104 A * 3/1980 Patenaude ............... B24B 55/06
                                                   144/252.1
D315,854 S * 4/1991 Kawakami ....................... D8/66
(Continued)

FOREIGN PATENT DOCUMENTS

EP    1 625 908 A1    2/2006
EP    2 143 533 A1    1/2010
(Continued)

OTHER PUBLICATIONS

International Preliminary Report on Patentability and Written Opinion for corresponding PCT Application No. PCT/EP2014/054756, filed Mar. 11, 2014, dated Jun. 5, 2014, 11 pages.
(Continued)

*Primary Examiner* — Jason Daniel Prone
*Assistant Examiner* — Richard D Crosby, Jr.
(74) *Attorney, Agent, or Firm* — Knobbe Martens Olson & Bear, LLP

(57) ABSTRACT

A cutting apparatus includes a cutting tool and a collection assembly designed for diverting, collecting and disposing dust generated during the cutting process. The apparatus includes a cutting tool, a collection assembly together with an optional dust separator and/or collection container. The air stream generated around the blade of the cutting tool
(Continued)

during operation diverts the generated dust particulates into the collection assembly of the cutting tool. The air stream can also transport the dust into the dust separator which transfers the dust into the collection container, when present. Optionally, the collection container further includes an air filtration assembly for storing and disposing the dust.

25 Claims, 19 Drawing Sheets

(51) Int. Cl.
  *B23D 59/00* (2006.01)
  *B23Q 11/00* (2006.01)
(58) Field of Classification Search
  USPC .......................................................... 30/273
  See application file for complete search history.

(56) References Cited

U.S. PATENT DOCUMENTS

| | | | | |
|---|---|---|---|---|
| 5,033,192 A | * | 7/1991 | Franz | B23D 59/006 30/124 |
| D415,001 S | * | 10/1999 | Welsh | D15/133 |
| 6,609,442 B2 | * | 8/2003 | Dibbern, Jr. | B23D 45/042 76/112 |
| 6,751,871 B2 | * | 6/2004 | Furnish | A01D 34/90 30/276 |
| 7,047,647 B1 | | 5/2006 | Mueller et al. | |
| D525,503 S | * | 7/2006 | Waldron | D8/66 |
| D575,126 S | * | 8/2008 | Farris Maple | D8/66 |
| 7,465,328 B2 | * | 12/2008 | Trautner | B23D 59/006 173/71 |
| 8,037,610 B2 | * | 10/2011 | Chambers | B23D 59/006 30/124 |
| 8,230,548 B2 | * | 7/2012 | Van Wagenen | H02G 1/1297 15/301 |
| 8,726,773 B2 | * | 5/2014 | Koegel | B23D 59/006 83/471.3 |
| 9,844,176 B2 | * | 12/2017 | Grande | A01D 34/4167 |
| 2002/0053757 A1 | * | 5/2002 | Andersen | B29B 17/0005 264/428 |
| 2006/0179985 A1 | * | 8/2006 | Bohne | B23D 59/006 83/78 |
| 2007/0044609 A1 | * | 3/2007 | Brazell | B23D 59/006 83/100 |
| 2008/0011138 A1 | * | 1/2008 | Brazell | B23D 59/006 83/100 |
| 2009/0114072 A1 | * | 5/2009 | Nishikawa | B23D 59/006 83/168 |
| 2009/0288533 A1 | * | 11/2009 | Meredith | B23D 59/006 83/168 |
| 2009/0313834 A1 | * | 12/2009 | Martin | B23D 59/006 30/124 |
| 2010/0269654 A1 | * | 10/2010 | Needel | B23D 59/006 83/100 |
| 2011/0079125 A1 | * | 4/2011 | Kuo | B23D 59/006 83/168 |
| 2011/0079207 A1 | * | 4/2011 | Guth | B23D 45/16 125/13.01 |
| 2013/0145634 A1 | * | 6/2013 | Cuzdey | B27B 9/02 30/376 |
| 2014/0223748 A1 | * | 8/2014 | Guth | B27G 19/04 30/391 |
| 2016/0016241 A1 | * | 1/2016 | Taylor | B23D 45/062 83/100 |
| 2016/0016270 A1 | * | 1/2016 | Batres | B23D 59/006 83/100 |

FOREIGN PATENT DOCUMENTS

| | | |
|---|---|---|
| FR | 2 949 374 A1 | 3/2011 |
| JP | 2006-088539 | 4/2006 |
| JP | 2007-050648 A | 3/2007 |
| NZ | 530184 A | 5/2005 |
| WO | WO 2005/070617 A1 | 8/2005 |
| WO | WO 2014/140052 A1 | 9/2014 |

OTHER PUBLICATIONS

Further Examination Report for corresponding New Zealand Application No. 711720, dated Apr. 11, 2017, in 3 pages.
Examination Report for corresponding New Zealand Application No. 2014230871, dated Feb. 3, 2017, in 3 pages.
First Examination Report for corresponding New Zealand Application No. 711720, dated Dec. 8, 2016, in 4 pages.
Further Examination Report for corresponding New Zealand Application No. 711720, dated Oct. 9, 2017, in 1 page.
Further Examination Report for corresponding New Zealand Application No. 711720, dated Aug. 1, 2017, in 2 pages.
Further Examination Report for corresponding New Zealand Application No. 711720, dated Sep. 4, 2017, in 2 pages.

* cited by examiner

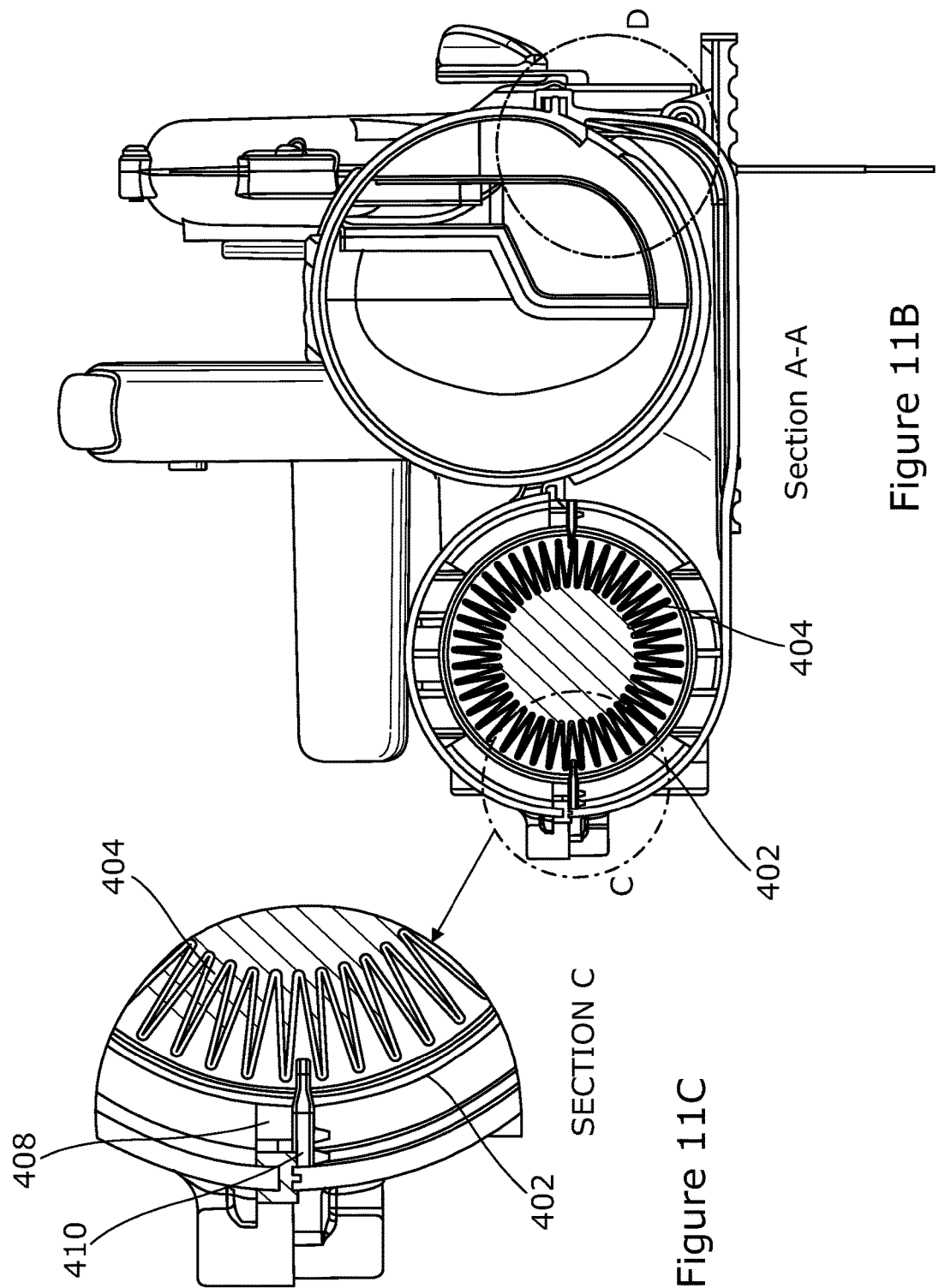

CUTTING APPARATUS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present disclosure generally relates to construction tools and more particularly, to an improved cutting tool with dust-collecting properties and methods of using such a device.

Description of the Related Art

The use of building materials in construction often requires the materials to be cut to specific lengths, sizes and shapes by a user in the field during installation. At a typical job site, a specific person usually operates the cutting tool and is designated as the "cutter." The cutter is able to deliver processed materials to installers and acquire new measurements for additional cuts from multiple locations. Cutting tools used at the job site to cut building materials can create a substantial amount of dust during the cutting process. Accordingly, there is a need to contain and remove such dust particles generated from the cutting process.

It is the object of the present invention to overcome or ameliorate at least one disadvantage of the prior art or to provide a useful alternative.

SUMMARY OF THE INVENTION

According to embodiments of the invention there is provided a cutting apparatus comprising a cutting tool, wherein the cutting tool comprises cutting means coupled to an output drive shaft of a drive mechanism operable to drive the cutting means; and a collection assembly, wherein the collection assembly comprises a casing which accommodates at least a portion of the cutting means, the casing further comprising a chamber for collecting matter generated by the cutting means wherein the chamber comprises an inlet and an outlet and a conduit intermediate the inlet and the outlet.

The advantage of the cutting apparatus of certain embodiments of the invention is that the cutting tool and the collection assembly operate together to divert, collect and dispose of particulate matter, for example, dust generated during the cutting process.

It is acknowledged that the term 'comprise' may, under varying jurisdictions be provided with either an exclusive or inclusive meaning. For the purpose of this specification, the term comprise shall have an inclusive meaning that it should be taken to mean an inclusion of not only the listed components it directly references, but also other non-specified components. Accordingly, the term 'comprise' is to be attributed with as broad an interpretation as possible within any given jurisdiction and this rationale should also be used when the terms 'comprised' and/or 'comprising' are used.

In one embodiment of the invention, the cutting means comprise a circular or rotary blade or a linear blade, each comprising a cutting edge, wherein the cutting edge can be used to cut materials as desired by the end user. It is of course understood that any cutting means suitable for use in the cutting tool of the invention known to the person skilled in the art can be used.

In a further embodiment of the invention, the output drive shaft of the drive mechanism operable to drive the cutting means, comprises a rotary drive shaft. In this embodiment of the invention, the cutting means are located on a rotary output drive shaft of the cutting tool such that the cutting means are able to rotate or turn about an axis of rotation provided by the rotary output drive shaft located on the cutting tool. In an alternative embodiment of the invention, the output drive shaft is a reciprocating drive shaft.

Conveniently the output drive shaft of the drive mechanism is operable to drive the cutting means through at least one period of motion. In practice, it is understood that in use the cutting means of the invention will cycle through a plurality of periods of motion such as rotation about an axis of rotation of a circular saw and/or reciprocating motion of a linear saw blade. In use, an air stream is generated by the cutting means as it moves through a plurality of periods of motion. It is generally understood that the faster the cutting means moves through each period of motion, the greater the velocity of the air stream generated.

In a further embodiment of the invention, the conduit of the collection assembly comprises a channel. Optionally, the channel is an open channel, wherein the conduit of the cutting tool is located adjacent the at least a portion of the cutting means seated within the casing. In a further embodiment of the invention, the conduit comprises an enclosed channel, wherein the casing comprises a wall intermediate the channel and the at least a portion of the cutting means seated within the casing. In a further embodiment of the invention the wall intermediate the channel and the at least a portion of the cutting means seated within the casing optionally comprises one or more openings.

Conveniently, the collection assembly comprises one or more casings wherein the or each casing accommodates at least a portion of the cutting means. In one embodiment of the invention, the collection assembly comprises an upper casing and a lower casing. In the following description, it is to be understood that the term 'upper casing' refers to the casing that is positioned adjacent a handle for a user to hold the cutting tool during use. The upper casing is positioned such that it is located above at least the portion of the work piece that is being cut when the cutting tool is in use. In the following description, it is also to be understood that the term 'lower casing' refers to the casing that is positioned below the 'upper casing' when the cutting tool is not in use. In a further embodiment of the invention, the or each casing is moveable between a first and second position whereby the cutting edge of the cutting means is covered when the or each casing is in the first position and whereby the cutting edge of the cutting means is exposed for use in the second position. Optionally in a further embodiment of the invention, the lower casing is moveable between a first position and a second position wherein in the second position the lower casing is seated within the upper casing.

In a further embodiment of the invention, the or each casing is configured to divert the generated particulate or dust matter into the chamber within the or each casing for transfer to the outlet for collection and disposal. In use, the geometry of the or each casing is configured to interact with the air stream generated by the cutting means causing the air and particulate or dust matter to enter into the or each casing. The structure and shape of the chamber within the or each casing is designed to increase the pressure of the moving air stream, causing the air stream to flow through the conduit of the chamber. Additionally as the pressure increases the air stream flows into the or each casing with an increased flow-rate allowing greater quantities of particulate or dust matter to be collected. In a further embodiment of the invention, the chamber is configured to be an aerodynamically shaped chamber which is specifically designed to enhance the fluid dynamics and air flow within the air chamber of the or each casing. In a further embodiment of the invention, the or each casing is configured to accommodate at least a portion of the cutting means such that the at least a portion of the cutting means is seated within the casing whereby the distance between the cutting edge of the cutting means and the or each casing is approximately 0.25" (0.64 cm)±0.125" (0.318 cm).

In one embodiment of the invention, the collection assembly comprises an upper casing, the upper casing having a chamber configured to divert particulate matter generated by the cutting means, and a particulate or dust separator, wherein the upper casing and the particulate or dust matter separator are in communication such that particulate matter generated by the cutting means can be directed from the upper casing into the particulate or dust matter separator. In a further embodiment of the invention the collection assembly comprises an upper casing and a lower casing, the upper casing having a chamber configured to divert particulate matter generated by the cutting means, and a particulate or dust matter separator, wherein the upper casing and the particulate or dust matter separator are in communication such that particulate matter generated by the cutting means can be directed from the upper casing into the particulate or dust matter separator. In a further embodiment of the invention, the collection assembly comprises an upper casing and a lower casing, the upper and lower casing each having a chamber configured to divert particulate matter generated by the cutting means; and a particulate or dust matter separator, wherein the upper casing and the particulate or dust matter separator are in communication such that particulate or dust matter generated by the cutting means can be directed from the upper and lower casings into the particulate or dust matter separator.

In a further embodiment of the invention, the or each casing also functions as a blade guard assembly thereby protecting an operator from the sharp cutting edge of the cutting means. In one embodiment of the invention, the or each casing is removable from around the cutting means to expose the cutting edge of the cutting means for use. In a further embodiment of the invention, the or each casing is moveable between a first and second position whereby the cutting edge of the cutting means is covered when the or each casing is in the first position and whereby the cutting edge of the cutting means is exposed for use in the second position. Conveniently, in a further embodiment of the invention, the or each casing automatically moves into the first position when the cutting means is not in use. In a further embodiment of the invention, the cutting apparatus is provided with locking means to secure the casing in either or a first or second position or at a position intermediate the first and second position. In a further embodiment of the invention, the lower casing moves between a first and second position wherein the lower casing covers at least a portion of the cutting edge of the cutting means in the first position and exposes at least a portion of the cutting edge of the cutting means for use in the second position. Conveniently, in a further embodiment of the invention, the lower casing seats within the upper casing when the lower casing is in the second position.

Additionally, in further embodiments of the invention, the cutting apparatus of the invention, is portable and light weight so that it does not restrict the mobility of the operator. In other embodiments, the cutting apparatus is stationary such that it is not moveable around a job site.

In various further embodiments of the invention, the cutting apparatus comprises the cutting tool of the invention together with either a particulate or dust separator, or a collection container. In a further embodiment of the invention, the cutting apparatus comprises the cutting tool of the invention together with a particulate or dust separator and a collection container.

In accordance with one embodiment, the cutting apparatus further comprises a particulate or dust separator. The particulate or dust separator allows the particulate matter to be separated from the moving air stream in order to facilitate collection of the dust particles. In a further embodiment of the invention, the particulate or dust separator comprises a cylindrical ramp and an auxiliary vent. In a further embodiment of the invention, the auxiliary vent is located on a side wall of the particulate or dust separator. The auxiliary vent assists in pulling dust particles out of the rotating air stream. In one embodiment, heavier and/or larger dust particles fall out of the air stream and into a collection means such as a basin for collection, while lighter and/or smaller dust particles remain with the air stream. The cylindrical ramp simultaneously diverts the moving air stream with the lighter and/or smaller particles without the heavier and/or larger particles, from the path along the interior circumference of the dust separator into the collection container.

In accordance with one embodiment, the cutting apparatus further comprises a collection container. The collection container allows the particulate matter to be stored for disposal. The collection container can be either portable for use around a job site or can be stationary. In one embodiment, the collection container can be a hollow pathway connected to a storage receptacle for storing the particulate matter. In such an embodiment, the hollow pathway can connect the storage receptacle to the particulate or dust separator and can allow the storage receptacle to be physically spaced from the particulate or dust separator by several feet or greater distances. In accordance with one embodiment, the collection container includes an air filtration assembly. Optionally, the air filtration assembly further comprises a filter cleansing apparatus. The filter cleansing apparatus mechanically agitates the filter and/or an agitator to disengage collected particulate matter from the air filter. Once disengaged, the air filter is removable from the collection container and the now disengaged particulates are disposable.

In accordance with a further embodiment of the invention, the air stream generated around the blade of the cutting tool during operation diverts the generated dust particulates into an upper casing. The air stream transports the dust particles from the upper casing into the dust separator. The particulate or dust separator contains a thoroughfare to transfer the dust into a collection container for storage and disposal. Optionally, in a further embodiment of the invention, the particulate or dust separator is an integrated particulate or dust separator.

In various embodiments, all of the parts of the apparatus can be manufactured as a single unit (e.g. to be sold as a new device). In other embodiments, various parts of the apparatus can be manufactured as a retrofit or add-on kit for use with existing cutting tools. In various further embodiments, a kit for retrofitting existing cutting tools such as circular saws is provided. The kit may comprise upper and lower casings configured to fit over existing cutting blade in a manner described herein. Optionally, the kit can further include a particulate or dust separator, and a collection container. It should be appreciated that the retrofit kit can include any of the components listed in the various embodiments.

In an embodiment, the cutting apparatus further includes a collection container, wherein the particulate or dust separator and collection container are in communication such that particulate matter generated during the use of the cutting tool can be directed from the particulate or dust separator into the collection container.

In one embodiment of the invention, the cutting tool is powered by an electric motor comprising either a direct or indirect current source. Conveniently, in a further embodiment of the invention, the electric motor is provided with an on-off switch.

In an embodiment, the cutting tool of the dust-collecting cutting apparatus is a circular saw, comprising circular cutting means. Optionally, the circular saw is a portable saw.

In a further embodiment of the invention the circular cutting means can be a planar cutting means or have a convex or concave configuration as desired by the end user.

In a further embodiment of the invention, the chamber of the upper casing comprises a front portion and a rear portion and an internal diameter extending substantially along a longitudinal axis of the upper casing between the front portion and the rear portion. Conveniently, the chamber is adapted to receive particulate matter. In yet another embodiment of the invention, the chamber of the upper casing has a variable internal diameter extending from the front portion to the rear portion. In another embodiment, the front portion of the chamber has a smaller internal diameter than the internal diameter at the rear portion. In yet another embodiment, the chamber has a continuously increasing internal diameter from the front portion to the rear portion.

In a further embodiment of the invention, the cutting apparatus further comprises a lower casing. In a further embodiment, the lower casing is rotatable into a cavity within the upper casing. In yet a further embodiment, the lower casing is configured to provide free passage of air and particulate matter into the upper casing. In yet another embodiment, the lower casing further includes one or more airfoil sections. Optionally the one or more airfoil sections include flow diverters. In an embodiment, the one or more airfoil sections allow air and particulate matter to pass through the lower casing into the upper casing. In a further embodiment of the invention, the airfoil sections and flow diverters further comprise angled contours to enhance uniform, steady, and/or laminar air flow through the flow diverters. In other embodiments of the invention, air foils and flow diverters comprise different profiles, including, for example, slots, notches, perforations, chamfers, fillets, and apertures of regular shape (e.g. rectangular, square, round, triangular, oval) and irregular shaped profiles.

According to a further embodiment of the invention, the particulate or dust separator has a hollow, cylindrical shape. In a further embodiment, the particulate or dust separator further includes a cylindrical ramp, wherein the ramp is located on an internal sidewall of the particulate or dust separator. In an embodiment, the particulate or dust separator further includes an auxiliary vent, wherein the vent is located on a side wall of the particulate or dust separator proximate the cylindrical ramp. In an embodiment, the vent creates a local negative pressure region when an air stream flows over the vent and causes large and/or heavy particles in the air stream to fall out of the air stream and through the vent.

In one embodiment of the invention, the collection container further includes an air filter. In an embodiment, the air filter is fully contained within the collection container. In an embodiment, the filter is affixed to an external handle, wherein the handle forming a seal to the collection container.

In one embodiment of the invention, the collection container further includes an air filtration assembly, wherein the air filtration assembly includes an air filter and an agitator. In a further embodiment, the air filter is affixed to an external handle, wherein the handle forms a seal to the collection container. In an embodiment, the agitator is mechanically interactable with the air filter to disengage particulate matter from the air filter. In an embodiment, the handle and/or agitator is moveable to mechanically engage in order to clean the air filter. In a further embodiment, the air filter is removable from the collection container to dispose of particulate matter stored in the collection container.

In one embodiment of the invention, during the cutting process, the lower casing is rotatable into an upper resting position, situated within a cavity in the upper casing. The lower casing is rotated into its upper resting position in the upper casing in order to fully expose the cutting edge of the blade and allow the blade to fully traverse work pieces that are longer than the diameter of the blade. In a further embodiment of the invention, the lower casing is configured with one or more airfoil sections. The airfoil sections include flow diverters which extend through the diameter of the lower casing and allow air and particulate matter to pass through the lower casing in its upper resting position. The airfoil sections utilize an aerodynamically efficient shape to allow the air stream to flow from the lower casing into the air chamber of the upper casing.

In accordance with one embodiment of the invention, there is provided a method of collecting particulate matter comprises activating an electric motor to cause the blade to rotate. The rotating blade is cut into a work piece generating particulate matter and an air stream around the blade. Particulate matter generated during the cutting process accompanies the air stream into the upper casing. The particulate matter and the air stream exit the outlet port of the upper casing and enter into a particulate or dust separator. The particulate or dust separator removes the dust from the air stream and causes the particulate matter to exit the outlet of the particulate or dust separator into a collection container. The air filter inside the collection container captures and traps the particulate matter.

In accordance with one embodiment, a method of collecting particulate matter further comprises separating large and/or heavy particles from the air stream. In such an embodiment, the particulate or dust separator further includes a cylindrical ramp and auxiliary vent, wherein the ramp and vent are located on an internal sidewall of the particulate or dust separator, and the vent is located proximate the cylindrical ramp. In such an embodiment, the vent creates a local negative pressure region when an air stream flows over the vent and causes large and/or heavy particles in the air stream to fall out of the air stream and through the vent. Smaller and/or lighter particles remain with the air stream and exit the outlet of the particulate or dust separator into the collection container. The air filter inside the collection container captures and traps the particulate matter.

In accordance with one embodiment, a method of enabling an air stream to enter the upper casing comprises activating an electric motor to cause the blade to rotate. The rotating blade is cut into the work piece generating particulate matter and an air stream around the blade. The lower casing rotates at least partially into the upper casing. The air stream carries the particulate matter through the flow diverters of the airfoil of the lower casing into the air chamber of the upper casing.

In accordance with one embodiment, a method of cleaning the air filter comprises rotating an exterior handle on the collection container. The air filter is mechanically contacted by an agitator, causing the filter to vibrate. The vibration of the air filter disengages the particulate matter from the air filter. The operator removes the filter assembly from the collection container and disposes of the particulate matter.

In accordance with one embodiment, a method of cleaning the air filter comprises moving an exterior slide mechanism longitudinal along the collection container. The air filter is mechanically contacted by an agitator, causing the filter to vibrate. The vibration of the air filter disengages the particulate matter from the air filter. The operator removes the filter assembly from the collection container and disposes of the particulate matter.

In accordance with one embodiment, a kit for retrofitting existing circular saws comprises upper and lower casings, a particulate or dust separator, and a collection container. The upper casing has an air chamber configured to divert particulate matter generated during use of the cutting tool, and the upper casing and the particulate or dust separator are in communication such that particulate matter generated during the use of the cutting tool can be directed from the upper casing into the particulate or dust separator. The particulate or dust separator removes the dust from the air stream and causes the particulate matter to exit the outlet of the particulate or dust separator into the collection container. The air filter inside the collection container captures and traps the particulate matter.

BRIEF DESCRIPTION OF THE DRAWINGS

The invention will now be described more particularly with reference to the accompanying drawings, which show by way of example only a number of embodiments of the cutting apparatus of the invention.

In the drawings,

FIG. 11B is a cross-sectional end view of the cutting apparatus of FIG. 11A at section A-A;

FIG. 11C is an enlarged view of section C of the cutting apparatus of FIG. 11B;

DETAILED DESCRIPTION OF THE PREFERRED EMBODIMENTS

Embodiments of the invention will now be described with reference to the accompanying figures, wherein like numerals refer to like elements throughout. Although several embodiments, examples and illustrations are disclosed below, it will be understood by those of ordinary skill in the art that the invention described herein extends beyond the specifically disclosed embodiments, examples and illustrations and can include other uses of the invention together with obvious modifications and/or equivalents thereof. The terminology used in the description presented herein is not intended to be interpreted in any limited or restrictive manner simply because it is being used in conjunction with a detailed description of certain specific embodiments of the invention. In addition, embodiments of the invention can comprise several novel features and no single feature is solely responsible for its desirable attributes or is essential to practicing the inventions described herein.

Figure 1:
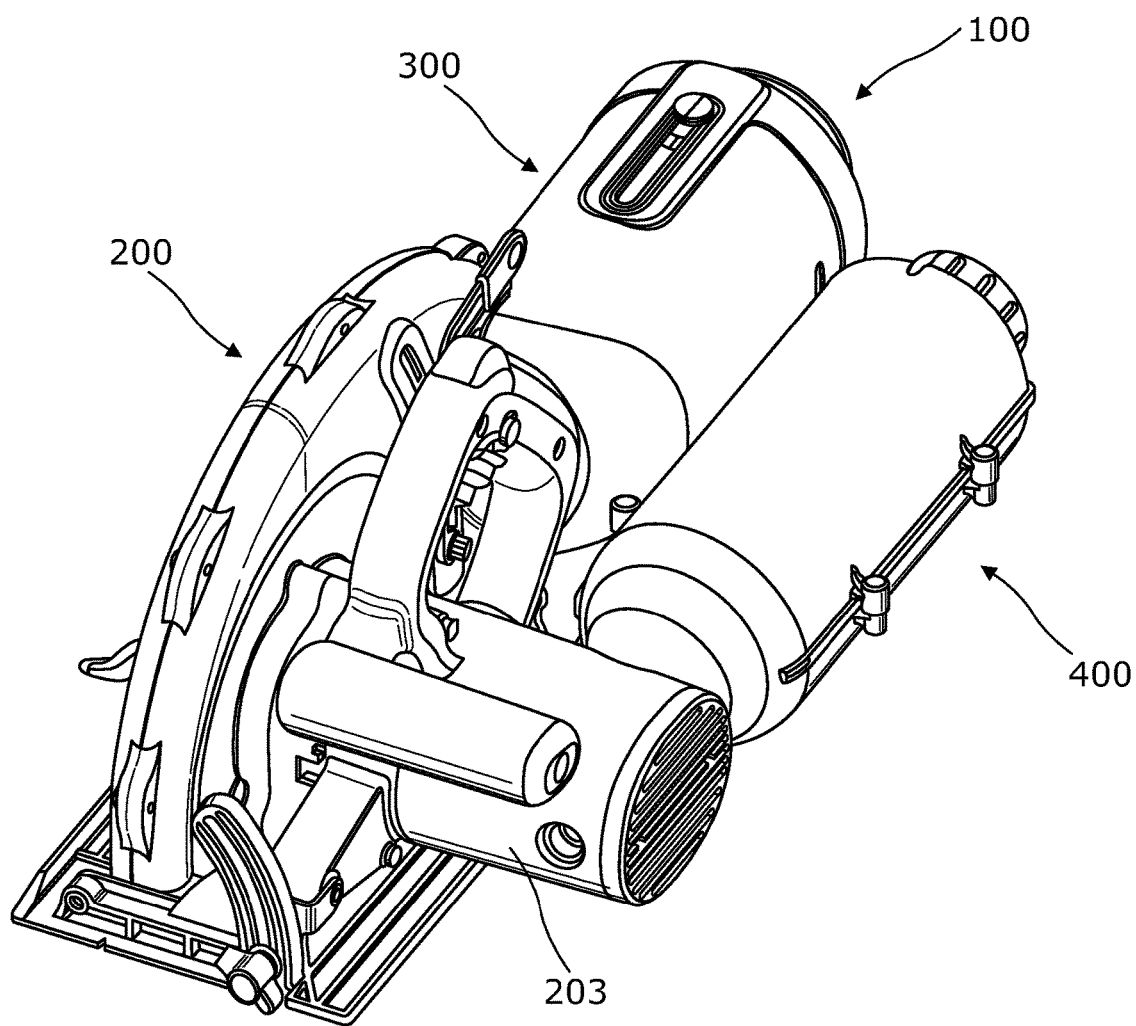
FIG. 1 is a perspective view of a cutting apparatus according to one embodiment of the invention.

Referring now to FIGS. 1 to 3 and 5, there is shown a first embodiment of the cutting apparatus or dust-collection cutting apparatus 100 of the invention. Referring specifically to FIG. 1, there is shown a cutting apparatus 100 comprising a cutting tool 200, a particulate or dust matter separator 300 and a collection container 400. In this embodiment of the invention, cutting tool 200 is in the form of a circular saw powered by an electric motor 203. Specifically, cutting tool 200 is a portable 7¼" (18.4 cm) electric circular saw, wherein electric motor 203 is a variable speed drive motor. It should be appreciated, however, that the cutting tool 200 can be any cutting tool as is known in the art for shaping, cutting, or forming materials. The cutting apparatus 100 shown in FIGS. 1 to 3 and 5 is depicted in a right-handed orientation, such that the cutting means 202 is on the right side of the electric motor 203, relative to the position of an end-user when using the cutting apparatus 100. It should be appreciated, however, that the cutting apparatus 100 could alternatively be configured in a left-handed orientation, such that the cutting means 202 are located on the left side of the electric motor 203, relative to the position of an end-user when using the cutting apparatus 100.

Figure 2:
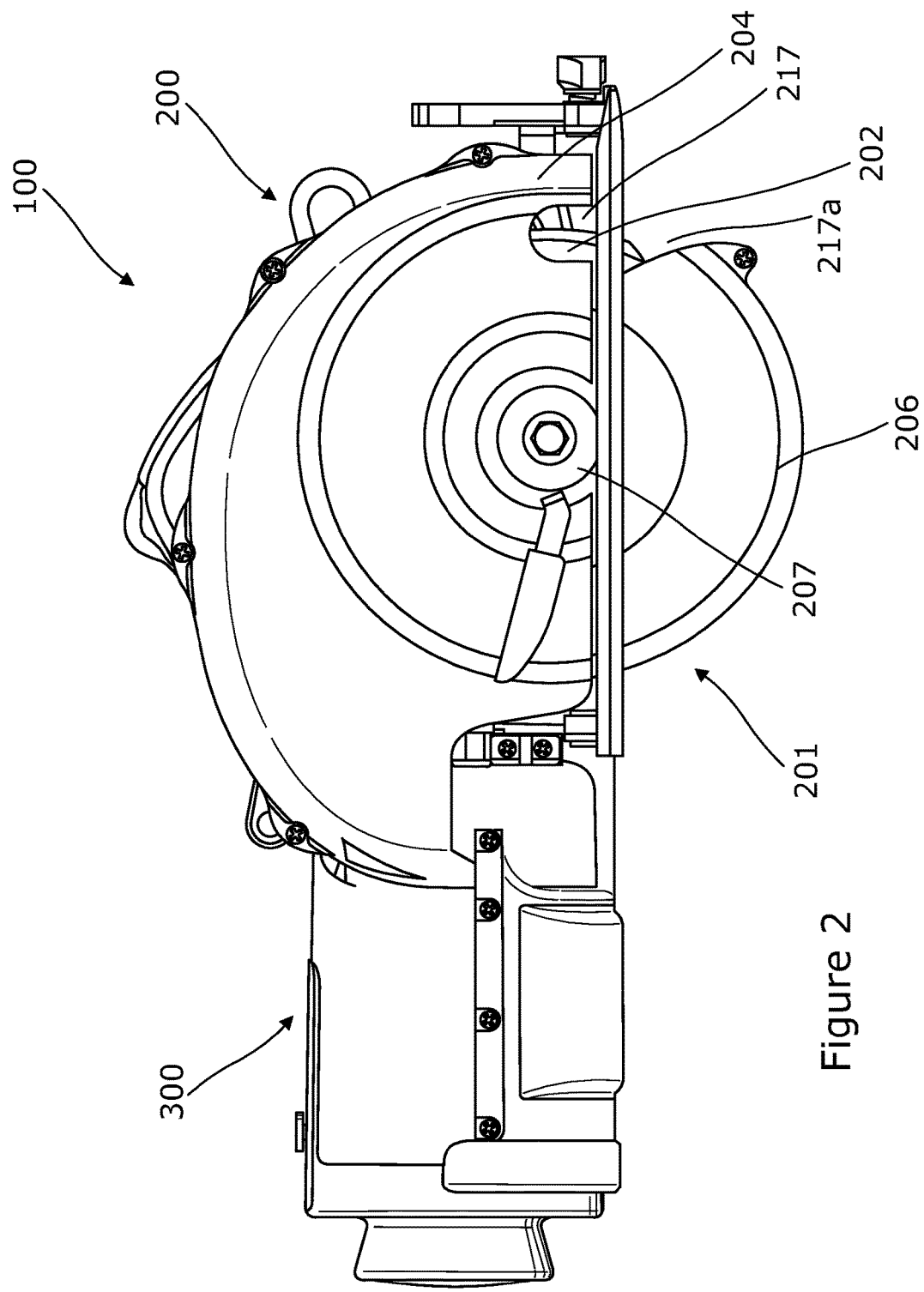
FIG. 2 is a first side view of the cutting apparatus of FIG. 1.
Figure 3:
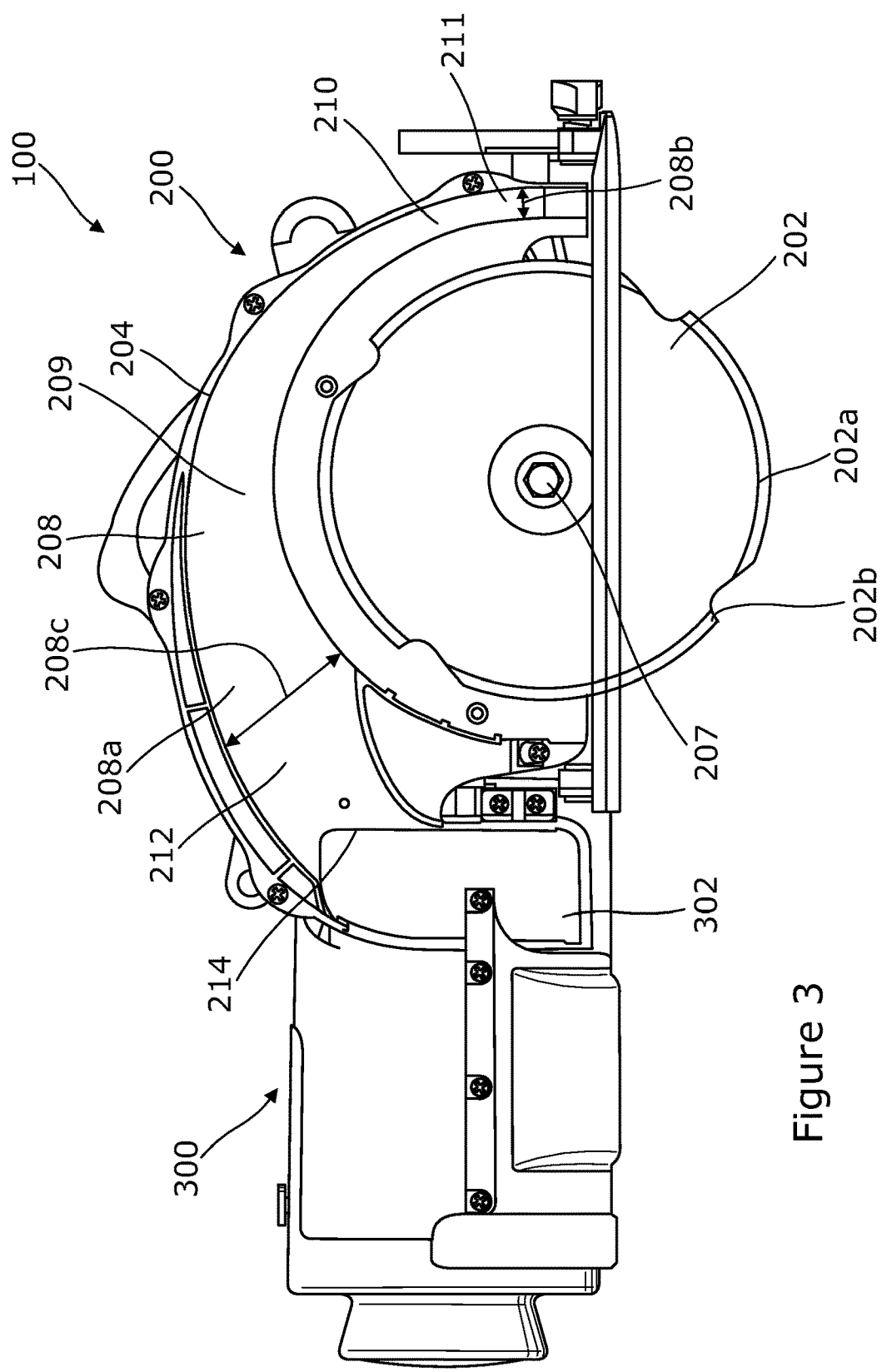
FIG. 3 is a further side view of the cutting apparatus of FIG. 1 with a portion of the casing removed.

With reference to FIGS. 2 and 3, cutting means 202 of cutting tool 200 is in the form of a circular blade having a central hole which is sized to allow cutting means 202 to be mounted to an output drive shaft 207 of the electric motor 203. In this embodiment of the invention, the output drive shaft 207 of electric motor 203 functions as a rotation shaft about which the circular cutting means 202 rotates when in use. Each complete rotation of the circular cutting means 202 through 360° about the rotation shaft or axis of rotation is regarded as one period of motion. Conveniently, the cutting means 202 and output drive shaft 207 of the cutting tool of the invention can be sized according to industry standards. In this embodiment of the invention, cutting means 202 comprise a thin kerf blade with a 5⁄8" (1.6 cm) arbor hole to rotatably mount cutting means 202 to the electric motor output drive shaft 207. Optionally, cutting means 202 further comprises one or more teeth 202b. In an alternative embodiment of the invention, cutting means 202 comprises a carbide blade, preferably Titanium Cobalt (TiCo) hi-density carbide with polycrystalline diamond (PCD) tips to help reduce dust formation during the cutting process. In a further embodiment of the invention the circular cutting means can have a planar or curved profile or a contoured configuration as desired by the end user.

As shown in FIG. 2, cutting means 202 is almost entirely surrounded by a blade guard assembly 201. A small portion of cutting means 202 is visible through cutaway portions 217 and 217a. The blade guard assembly 201 is designed to protect an end user from the cutting edge of cutting means or circular blade 202. Conveniently, the circular blade 202 seats within the blade guard assembly 201 such that the blade guard assembly 201 surrounds the cutting means 202 without interfering with cutting means 202. In this embodiment of the invention, the blade guard assembly 201 also functions as the collection assembly of the invention. The blade guard assembly or collection assembly 201 comprises an upper casing 204 and a lower casing 206. Upper and lower casings 204 and 206 are configured to accommodate the circular blade 202. Conveniently, in this embodiment of the invention, the geometry of the upper and lower casings 204 and 206 is slightly greater than that of the circular cutting means 202 seated within the blade guard assembly 201. In practice, the radius of the upper and lower casings 204 and 206 are approximately 0.25" (0.64 cm)±0.125" (0.318 cm) greater than the radius of the circular cutting means.

Referring now specifically to the embodiment shown in FIG. 3, there is shown the cutting apparatus 100 of FIG. 1 with a portion of the blade guard assembly 201 removed to shown the interior of the upper casing 204. Upper casing 204 comprises chamber 208 which has a front portion 210 and a rear portion 212. In the embodiment shown therein, chamber 208 is provided with an inlet 211, an outlet 214 and a conduit 209 intermediate the inlet 211 and the outlet 214. Chamber 208 or conduit 209 has a variable diameter 208a along its longitudinal axis wherein the front portion 210 of chamber 208 has a diameter 208b which is smaller and/or narrower than the diameter 208c at the rear portion 212 of chamber 208. Accordingly, chamber 208 or conduit 209 comprises a continuously increasing diameter 208a from the front portion 210 or inlet 211 to the rear portion 212 or outlet 214. As depicted in FIG. 3, in this embodiment of the invention, the upper casing 204 is configured with involute geometry wherein the curve of the upper casing 204 is the involute of the axis of rotation 207 of cutting means 202.

Figure 4:
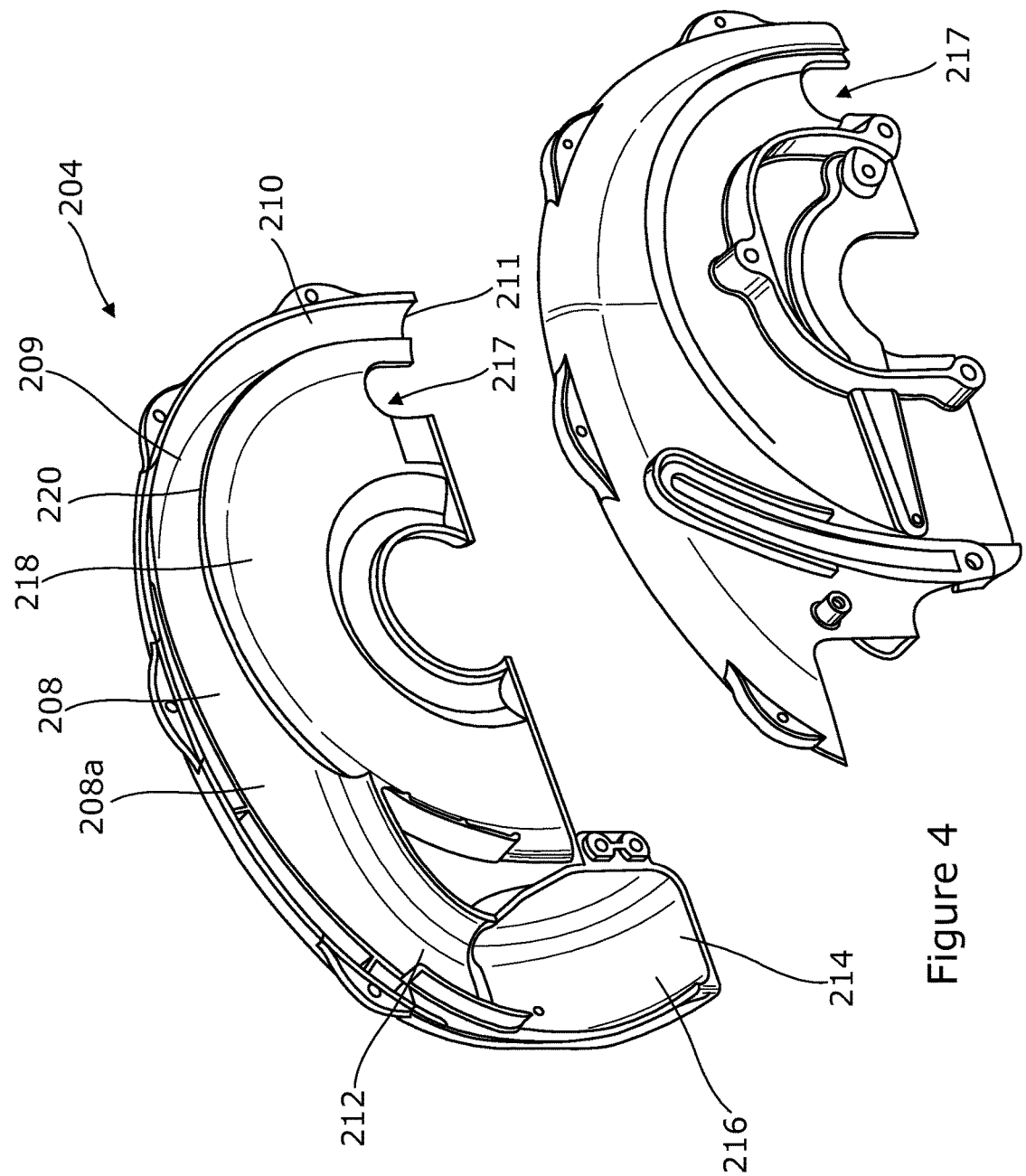
FIG. 4 is an exploded perspective view of the upper casing of the cutting apparatus of the invention.

Referring now to FIG. 4, there is shown an exploded view of the upper casing 204 depicted in a left-handed orientation (i.e. the blade is designed to be on the left side of the electric motor 203, relative to the position of the user) according to one embodiment of the invention. As described above, it should be appreciated that the upper casing 204 could alternatively be configured in a right-handed orientation, such that the blade 202 is designed to be on the right side of the electric motor 203, relative to the position of the user. Upper casing 204 shown in FIG. 4, is identical to the upper casing 204 shown in FIG. 3, accordingly, the internal diameter 208a of chamber 208 or conduit 209 has a variable diameter along its longitudinal axis wherein the diameter at the inlet 211 is smaller and/or narrower than the diameter at the outlet port 214 of the upper casing 204. Chamber 208 of upper casing 204 further comprises a projection 220, partially defining the walls of the air chamber 208 to form an enclosed conduit 209. Although not shown in this embodiment, it is possible for projection 220 to further comprise one or more openings to enhance transfer of particulate matter into the conduit 209 or chamber 208.

The outlet port 214 of the upper casing 204 further comprises a mating surface 216 for the inlet of the particulate or dust separator 300 (shown in FIG. 3), wherein the particulate or dust separator 300 is conjoined with the upper casing 204 to facilitate flow of particulate matter from the conduit 209 or chamber 208 to the particulate or dust separator 300. In this embodiment of the invention, the mating surface is in the form of a curved flange 216 to accommodate the particulate or dust separator 300. It is to be understood that flange 216 can adopt any suitable shape, for example, any one of an angled or arced shape, or alternatively a complex shape comprising a number of different shapes to accommodate the particulate or dust separator 300.

Upper casing 204 additionally includes a cutaway portion 217 to provide an additional air supply to increase the volume of the air entering the air stream and allow greater quantities of particulate matter to be collected. In the embodiment of the invention shown in FIGS. 2, 3, 4 and 5, cutaway portion 217 is in the form of a notch. It is to be understood that the cutaway portion could adopt any suitable shape known to a person skilled in the art that allows additional air supply to enter the air stream.

With reference to FIG. 4, there is provided a cavity 218 within upper casing 204. In practice, lower casing 206 rotates about the axis of rotation 207 provided by the output drive shaft 207 to seat in an upper resting position within cavity 218 of upper casing 204 thereby exposing the lower section of cutting means 202 for use.

Figure 5:
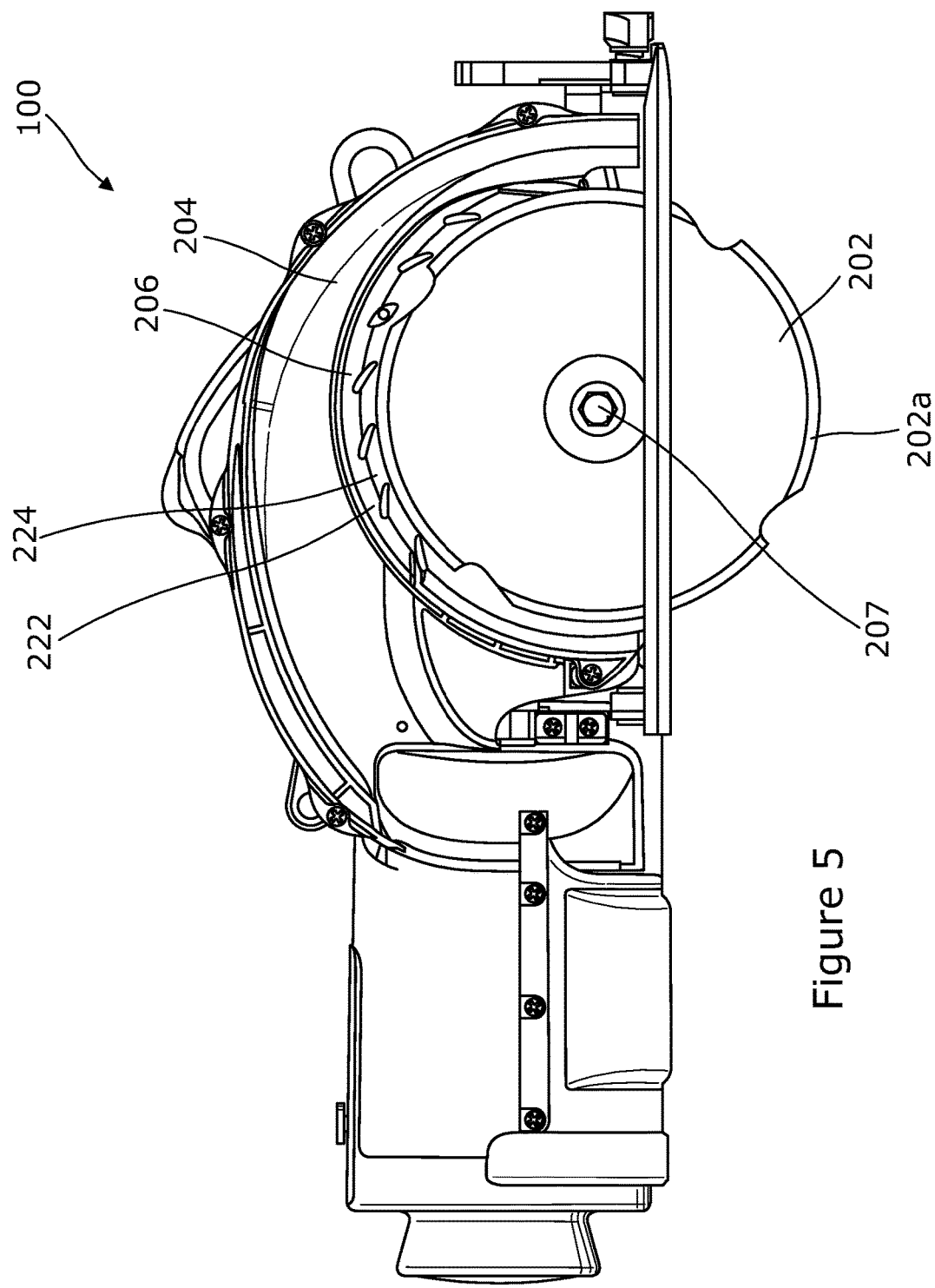
FIG. 5 is a side view of the cutting apparatus of FIG. 1 with a portion of the casing removed to show the lower casing seated within the upper casing.

In the embodiment of the invention shown in FIG. 5, the lower casing 206 is shown positioned in the upper resting position in cavity 218 within the upper casing 204. Although not shown in this embodiment of the invention, cutting tool 100 further comprises means for locking lower casing 206 into a desired position. For example, in one embodiment of the invention, the lower casing 206 could be locked into position surrounding cutting means 202 such that the lower casing forms part of the blade guard assembly 201, alternatively lower casing 206 could be secured in the upper resting position 218 such that the cutting means is exposed for use. When lower casing 206 rotates into its upper resting position, the cutting edge 202a of the blade 202 is fully exposed. This allows blade 202 to fully traverse items that are longer than the diameter of the blade 202. Generally, lower casing 206 rotates about the axis of rotation 207 in a direction opposite the linear path of the rotating blade 202 so that it does not interfere with the item being cut. It is also possible to lock lower casing 206 in any other position intermediate the upper resting position or the blade guard assembly position as desired by an end user.

Figure 6B:
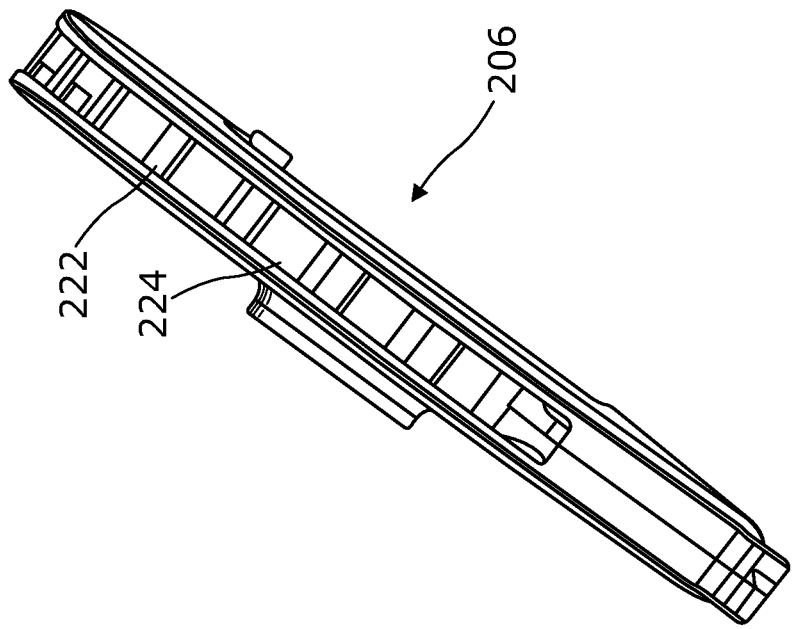
FIGS. 6A and 6B are alternate perspective views of the lower casing of the cutting apparatus of the invention.
Figure 6A:
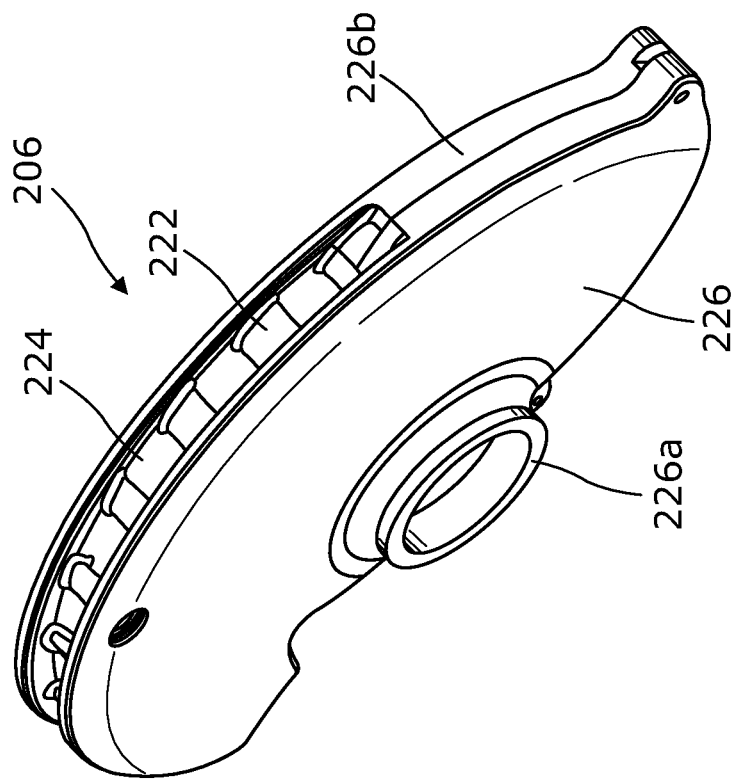

Referring now to FIGS. 6A and 6B, there is shown alternate perspective views of the lower casing 206 of FIG. 5. In this embodiment of the invention, lower casing 206 comprises a substantially U-shaped channel 226 configured to accommodate a portion of the cutting means 202. Lower casing 206, further comprises connecting means 226a to rotatably mount lower casing 206 to electric motor output drive shaft 207 or axis of rotation 207. It should be understood that in other embodiments of the invention, the lower casing 206 could be removably attached to the electric motor output drive shaft 207 whereby the lower casing 206 is physically removed from the cutting tool 200 to expose cutting means 202.

In this embodiment of the invention, lower casing 206 additionally comprises one or more airfoil sections 222 positioned spaced apart from each other on the base member 226b of the substantially U-shaped channel 226. The airfoil sections 222 are configured to adopt an aerodynamic shape. Optionally the airfoil sections 222 further comprise flow diverters 224. In a further embodiment of the invention, the airfoil sections and flow diverters 224 extend through the base member 226b of the lower casing 206. Conveniently in use, the airfoil sections 222 and optional flow diverters 224 allow air and particulate matter to pass through the lower casing 206. Additionally, the airfoil sections 222 and flow diverters 224 function when the lower casing 206 is in its upper resting position or in any orientation along its rotating path. In a further embodiment of the invention, the airfoil sections 222 and flow diverters 224 further comprise angled contours to enhance uniform, steady, and/or laminar air flow through the flow diverters 224. Although not shown, it is to be understood that in other embodiments of the invention, air foils 222 and flow diverters 224 could comprise different profiles, including, for example, slots, notches, perforations, chamfers, fillets, and apertures of regular shape (e.g. rectangular, square, round, triangular, oval) and irregular shaped profiles. It should also be appreciated that the design of the flow diverters can include one or more different types of profiles within the same casing. It is to be understood that these additional features are designed to enhance the operation and efficiency of the upper casing in removing particulate matter generated by the saw. In other embodiments of the cutting tool of the invention, the lower casing 206 is provided without any additional features such as airfoil sections or flow diverters. In such embodiments, the lower casing merely acts as a blade guard to protect an end user from the cutting edge of cutting means 202.

The airfoil sections 222 of the lower casing 206 can provide an aerodynamically efficient shape for the air stream to flow from the lower casing 206 into the air chamber of the upper casing 204. The cross section of the airfoil sections 222 can generate a pressure drop across the open surfaces of the flow diverters 224 to assist in transferring the air through the passages provided between the airfoil sections 222.

Operation of cutting apparatus 100 of FIG. 1 will now be described with reference to FIGS. 3 and 7. It is generally understood that when using cutting tool 200 to cut an article such as, for example, building material, that the blade guard assembly 201 is removed or retracted to expose cutting means 202. It is also generally understood that the cutting means 202 generates dust or particulate matter comprising particles of varying sizes during the cutting process. In the following, reference will be made to movement of the air stream through both the upper and lower casings 204, 206. It is to be understood that the cutting apparatus of the invention operates in the most basic embodiment with a cutting means 202 and an upper casing 204. The lower casing 206 is provided in the form shown below to enhance the operation of the most basic embodiment of the invention.

During the cutting operation, the rotation of the blade 202, creates rotational movement in the air surrounding the blade 202 and also provides centrifugal acceleration. If blade 202 is curved, rotational movement of blade 202 causes centrifugal acceleration of the air which forces the air in a tangential and radial direction outward (i.e. away from the center of the blade). As the air surrounding the blade 202 is projected away from the center of the blade 202, a low-pressure area is created, causing additional air to enter near the center of the blade 202, forming an air stream around the blade 202. The path of the air stream will be described more fully with reference to FIG. 7, below. The air stream flow is due to viscous drag forces generated off the sides of the rotating blade 202, resulting in shear forces imparted to the air surrounding the cutting tool blade 202. Rotational motion of the blade 202 projects the air stream at high speed into the volume between blade 202 and casings 204, 206. Casings 204, 206 are specifically designed to seat around blade 202 such that the radii of the casings are slightly larger than the radius of blade 202. This is to increase the pressure of the moving air stream. The increased pressure causes the air and particulate matter to enter into the casings 204, 206 and flow through the air chamber 208 in the upper casing 206. The increased pressure additionally causes an increased flow-rate of the air stream within the casings to allow greater quantities of particulate matter to be collected.

With further reference to FIG. 3, the air stream around the blade 202 moves in a counterclockwise direction (relative to the orientation of the cutting tool 200 in FIG. 3) and can be either laminar or turbulent flow. The dust or particulate matter generated by the cutting means 202 when in use, travel along with, and in the direction of, the air stream around the blade 202. The casings 204 and 206 of the blade guard or collection assembly 201 are configured to increase the flow rate of the air stream generated by the rotating blade 202, thereby diverting the particulate matter away from the cutting tool 200. Thus the dust or particulate matter is diverted away from the operator and collected for disposal.

During cutting, the generated dust or particulate matter is projected away from the blade 202 tangential to its outside diameter 202a in the counterclockwise direction by virtue of the air stream. The dust is projected in an outward direction along the path of the air stream toward and into the cutting tool's upper casing 204. In such an embodiment, upper casing 204 acts as an inlet 211 for collecting the generated dust. In the embodiment shown in FIGS. 3 and 7, chamber 208 or conduit 209 has a confined, aerodynamic shape which enhances the fluid dynamics and air flow within the chamber 208 or conduit 209. In the embodiment shown in FIG. 3, chamber 208 of upper casing 204 comprises a variable chamber diameter 208a along its longitudinal axis wherein diameter 208a is smaller and/or narrower nearer the front portion 210 and larger and/or wider nearer the rear portion 212. Such a configuration can be used to reduce flow leakage downstream from the front portion 210 of the upper casing 204. A larger internal chamber diameter 208a nearer the rear portion 212 can additionally help maintain and/or increase uniform, steady, and/or laminar flow through the outlet port 214 and into the particulate or dust separator 300. In the embodiment shown, chamber 208 is configured to be smooth and continuous without any internal corners to maintain and/or promote uniform, steady, and/or laminar flow.

The ejected air stream enters chamber 208 at high velocity, raising the pressure of the moving air stream. The pressure of the air stream being forced into chamber 208 or conduit 209 causes the air stream to flow from the inlet 211 or front portion 210 of conduit 209 or chamber 208 towards the rear portion 212 of the chamber 208 and into the outlet port 214. Utilizing these effects, the interaction between the blade 202 and its upper casing 204 geometry causes the air stream to flow. The rotating blade 202 imparts high acceleration to the air stream and particulate matter, forcing them radially outward from the blade 202 into the space between the rotating blade 202 and the upper casing 204. The highly accelerated air stream and particulate matter are ejected into an air chamber 208 within the upper casing 204. The aerodynamic shape of the air chamber 208 can help to increase the flow-rate of the air stream within the casings and allow greater quantities of particulate matter to be collected.

Figure 7:
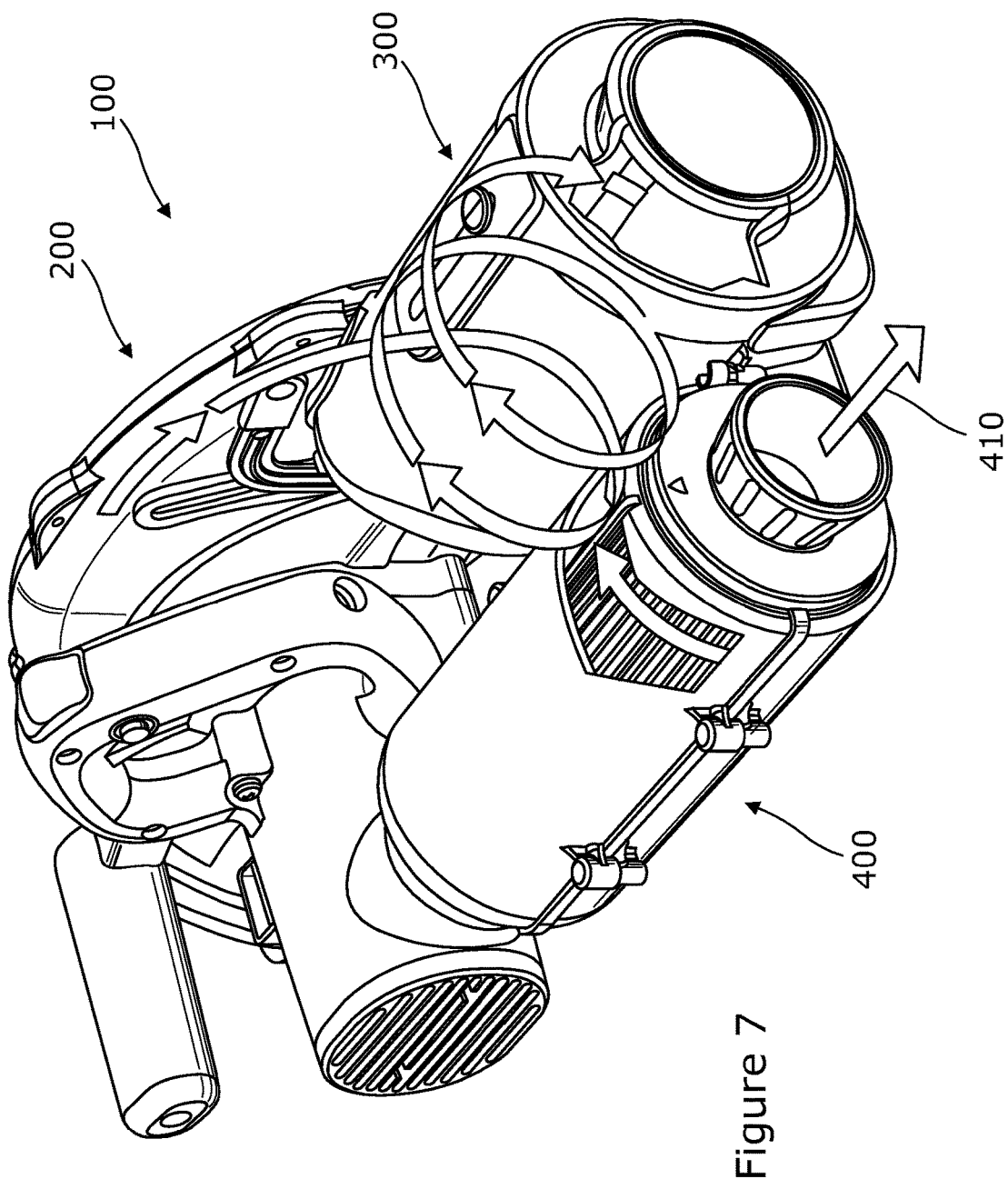
FIG. 7 is a perspective view of the cutting apparatus of FIG. 1 showing an air stream path according to one embodiment of the invention.

With further reference to FIGS. 3 and 7, conduit 209 of chamber 208 or provides a path for the dust to travel for collection. As outlined above, the dust or particulate matter travels within the air chamber 208 of upper casing 204 in a counterclockwise direction (relative to the orientation in FIG. 3) from the front portion 210 of the upper casing 204 to the rear portion 212 of the upper casing 204. Once the dust and air stream are received in the casings 204, 206, the particulate or dust separator 300 can be used to separate the particulate matter from the air stream and store the captured particulate matter for disposal. The rear portion 212 of the upper casing 204 includes an outlet port 214 to direct the dust from the upper casing 204 into a particulate or dust separator 300 for dust collection. The particulate or dust separator 300 includes an inlet port 302 which mates to the outlet port 214 of the upper casing 204. As shown in FIG. 7, particulate or dust separator 300 is further conjoined with collection container 400 to collect the dust or particulate matter.

FIG. 7 illustrates the path of the air stream described above; the air stream is shown in the form of directional arrows superimposed on the cutting apparatus 100 of FIG. 7. The air stream enters casing 206 of the cutting tool 200 and travels along conduit 209 of chamber 208 within the upper casing 204. The air stream then exits the rear portion 212 of the upper casing 204 and enters the particulate or dust separator 300. As described more fully with respect to FIG. 8A and FIG. 8B, below, once in the particulate or dust separator 300, the air stream then travels along the inner circumference of the particulate or dust separator 300. In one embodiment of the invention, larger particles fall out of the air stream in this area. Conveniently removable collection means, for example, a basin (not shown) is provided to collect the larger particles. Smaller particles continue with the air stream and enter into collection container 400. Conveniently, a pleated filter is provided in the collection container 400. As the air stream passes through the collection container 400 to exit the cutting apparatus, the smaller particles are collected on the filter. Conveniently, the filter component of the collection container 400 can be removed, allowing for disposal of the smaller dust particulate matter.

Figure 8A:
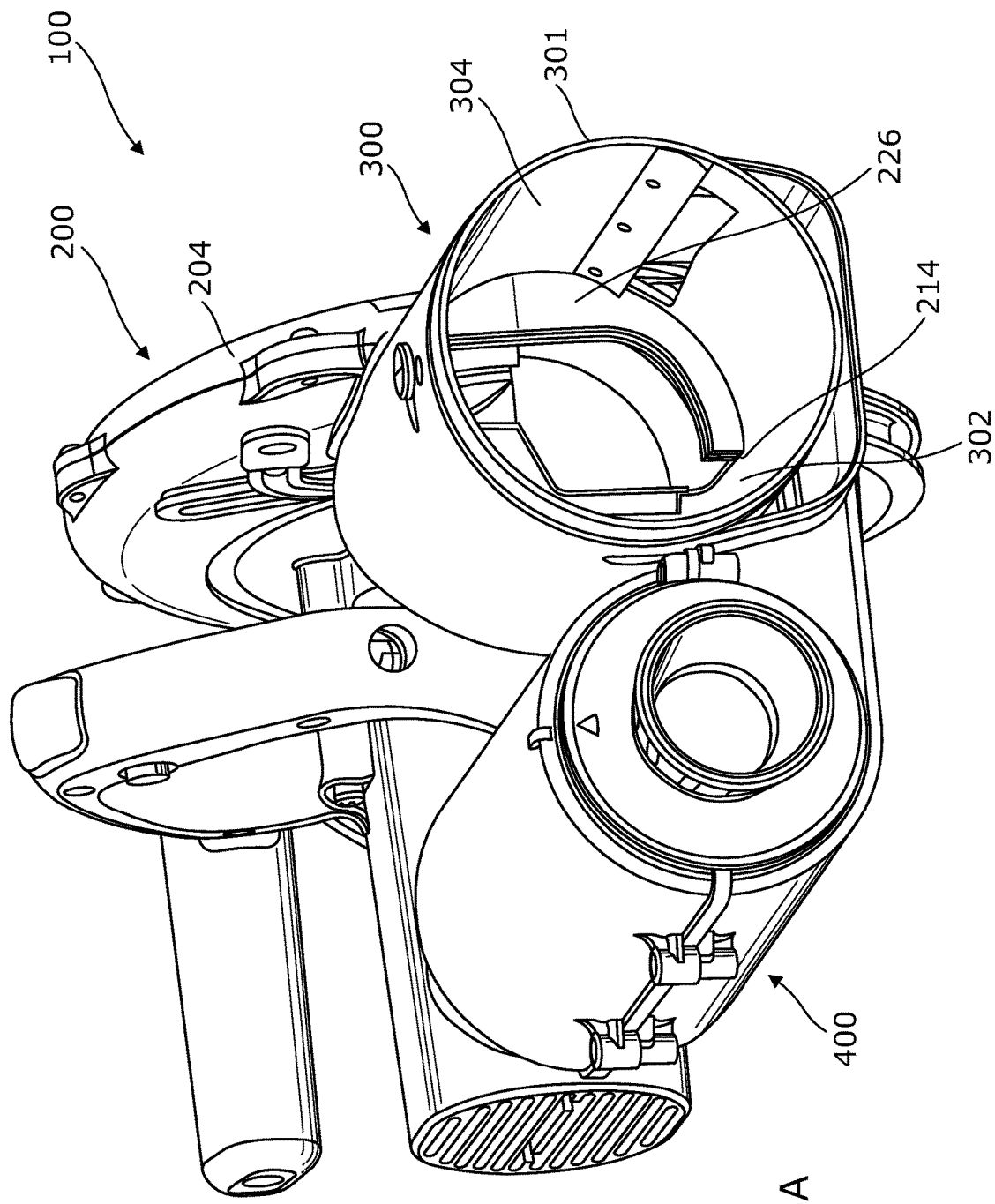
FIGS. 8A and 8B are alternate perspective end views of the cutting apparatus showing the particulate or dust separator and collection container of the invention.

FIG. 8A is a perspective view of the cutting apparatus 100 with the particulate or dust separator 300 and collection container 400 with a portion of the particulate or dust separator 300 removed to show the interior of the particulate or dust separator 300. In the embodiment shown, particulate or dust separator 300 includes a generally hollow, cylindrical tube 301 which allows the dust particulates to be transported from the upper casing 204 into the collection container 400. The particulate or dust separator 300 includes an inlet port 302, best depicted in FIG. 9, which mates to the outlet port 214 of upper casing 204. The air stream and dust particulates are directed such that they exit the outlet port 214 of the upper casing 204 and enter the inlet port 302 of the particulate or dust separator 300 along the interior circumference or sidewall 304 of the particulate or dust separator 300. The interior of the particulate or dust separator 300 is configured such that the air stream and dust particulates have a smooth transition from the outlet port 214 of the upper casing 204 to the inlet port 302 of the particulate or dust collector 300 to maintain uniform, steady, and/or laminar flow. The path of the air stream and dust particulates is determined by the centrifugal forces that push the particulate matter against the interior sidewall 304 of the particulate or dust separator 300, resulting in a relatively particulate-free zone in the center of the particulate or dust separator 300. The air stream and dust particulates travel in a spiral or helix configuration about the interior circumference or sidewall 304 of the particulate or dust separator 300. Preferably, the particulate or dust separator 300 forms a cyclone. The outlet port 214 of the upper casing 204 can also include an internal flow deflector 226, which can help orient the air stream and particulates along the interior circumference 304 of the particulate or dust separator 300. The internal flow deflector 226 helps direct the air stream and the particulate matter against the sidewall 304 of the particulate or dust separator 300 such that the center of the particulate or dust separator 300 remains relatively particulate-free during use.

Figure 8B:
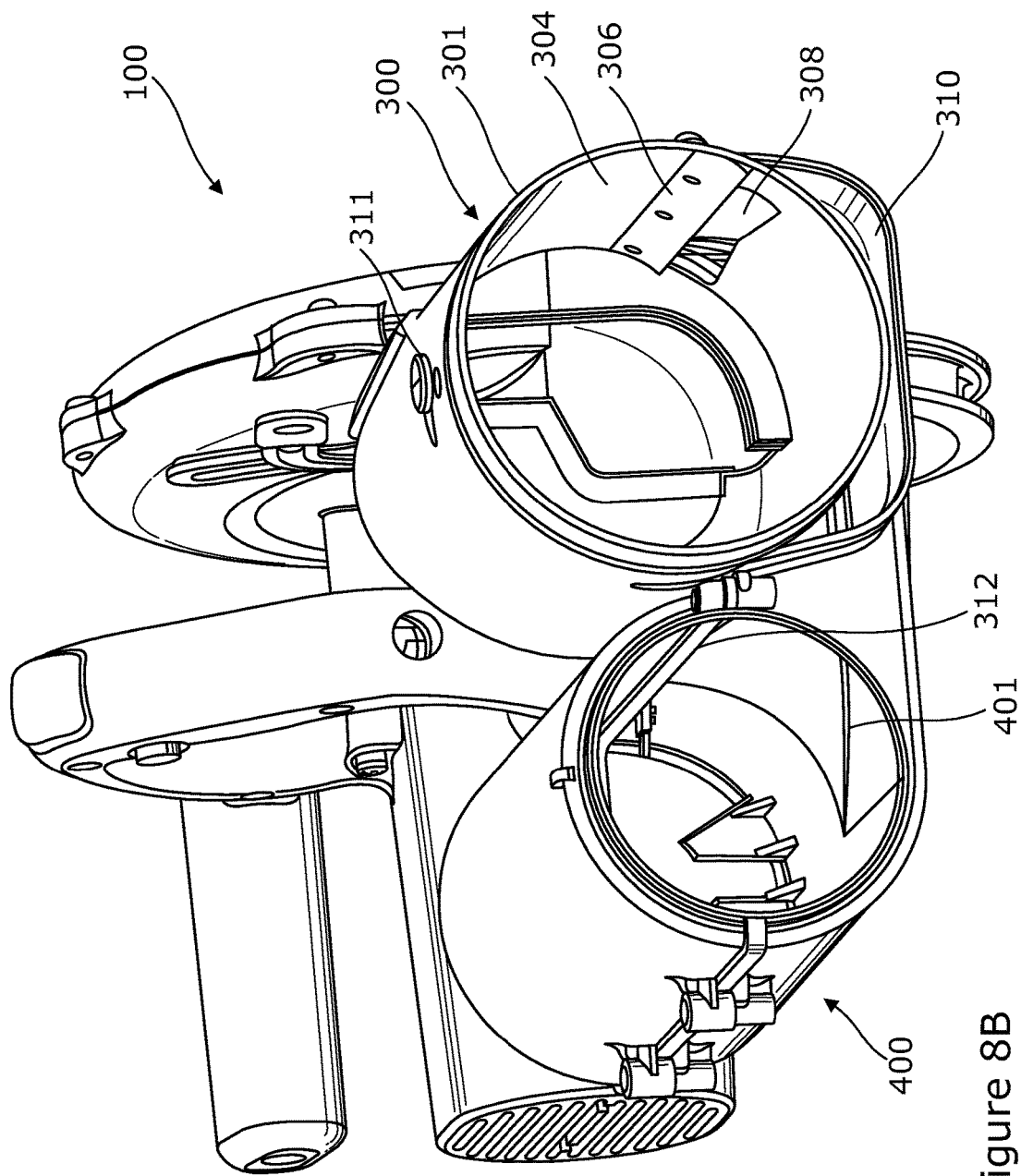

FIG. 8B is a further perspective view of the cutting apparatus 100 with the particulate or dust separator 300 and collection container 400 of FIG. 8A now showing the collection container 400 with the filter removed. With reference to FIG. 8B, the particulate or dust separator 300 comprises a cylindrical ramp 306 and an auxiliary vent 308. The cylindrical ramp 306 and the auxiliary vent 308 are located on a sidewall 304 of the particulate or dust separator 300. The auxiliary vent 308 assists in removing larger dust particles from the rotating air stream by creating a localized region of negative pressure. In one embodiment, heavier and/or larger dust particles can fall out of the air stream and into either the tube of dust separator 300 or a collection area 310 for collection, while lighter and/or smaller dust particles remain with the air stream. The cylindrical ramp 306 simultaneously diverts the moving air stream, without the heavier and/or larger particles, from the path along the interior circumference of the particulate or dust separator 300 into the collection container 400.

In the embodiment shown in FIGS. 8A and 8B, the particulate or dust separator 300 can include a release mechanism 311. Release mechanism 311 allows the cap or cover of cylindrical tube 301 to be removed from the particulate or dust separator 300 in order to facilitate removal of heavier and/or larger particles that have been stored in the collection area 310. In various embodiments, the release mechanism 311 can be a latch, a screw, a thumbscrew, a hook, a button, a snap, or any other fastening device.

With further reference to FIG. 8B, collection container 400 includes a thoroughfare 401 between the particulate or dust separator 300 and the collection container 400 allowing the captured dust particulates to exit the particulate or dust separator 300 and enter the collection container 400. Additionally, the particulate or dust separator 300 includes one or more outlet ports 312 on the side wall opposite to the auxiliary vent 308. The one or more outlet ports 312 and the thoroughfare 401 enables the air stream together with the smaller dust particles to exit the particulate or dust separator 300 and enter the collection container 400. Thoroughfare 401 provides a unidirectional flow of air and dust from the particulate or dust separator 300 to the collection container 400. In various embodiments, the one or more outlet ports 312 can include different profiles, including slots, notches, perforations, and openings of regular shape (e.g. rectangular, square, round, triangular, oval) and irregular shape.

Figure 9:
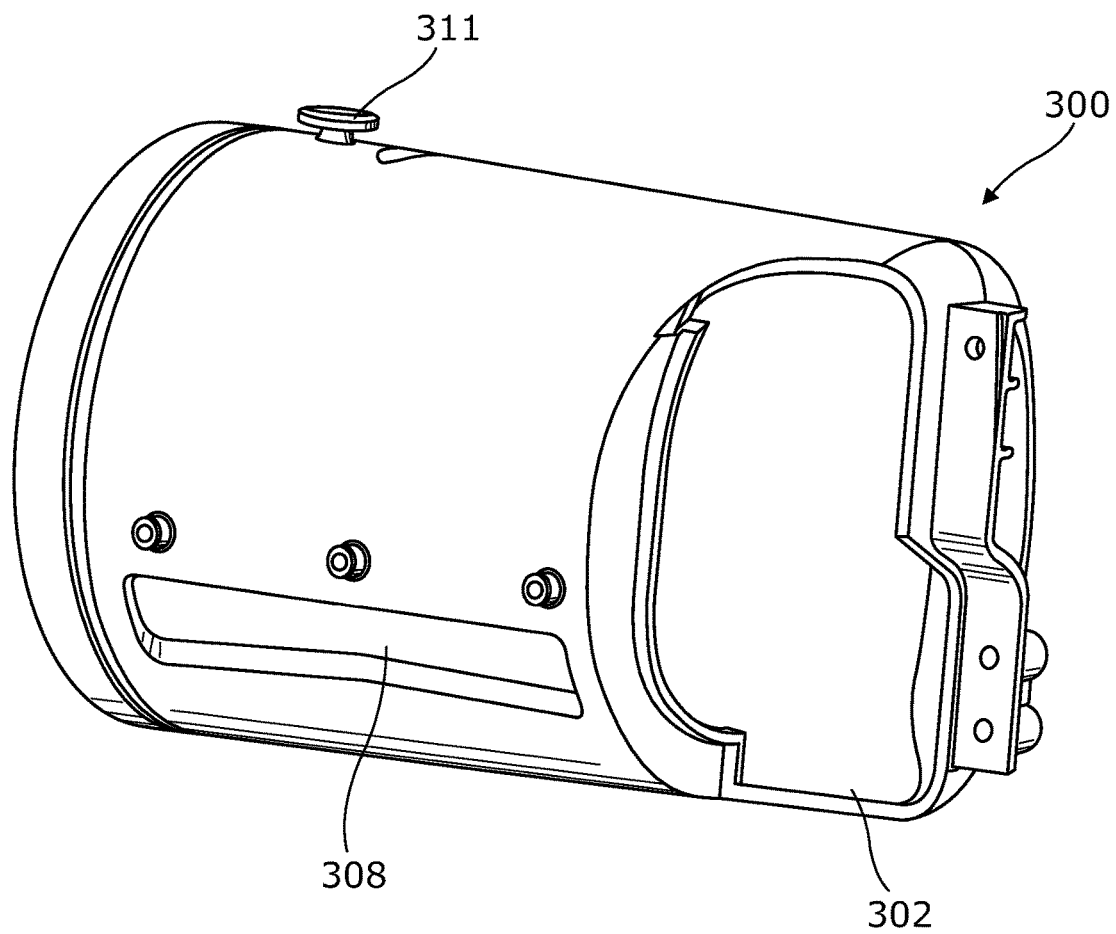
FIG. 9 is a side view of one embodiment of the particulate or dust separator of the cutting apparatus of the invention.

FIG. 9 is a perspective view of the dust separator 300 of FIGS. 8A and 8B removed from the cutting apparatus 100 showing clearly the inlet port 302, auxiliary vent 308, and release mechanism 311.

Figure 10:
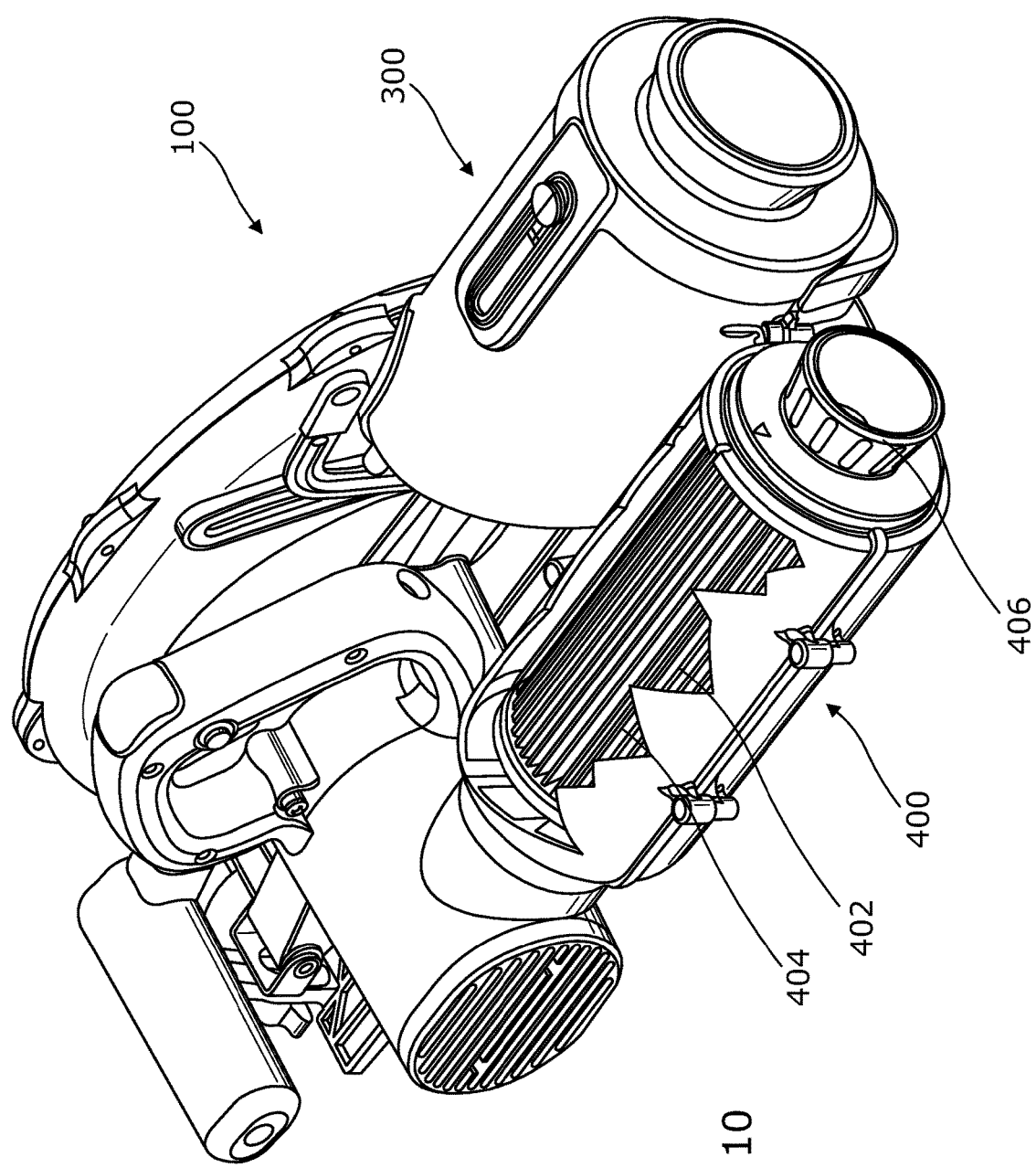
FIG. 10 is a partial cut away perspective view of the cutting apparatus of FIG. 1 showing the air filter of the collection chamber of the invention.

Referring now to FIG. 10 there is shown a perspective view of the dust separator 300 and collection container 400 of the cutting apparatus according to the embodiment of FIG. 1. A portion of the collection container 400 is cut away to show the air filtration assembly 402 including an air filter 404 in position within the collection container 400. Air filter 404 is fully contained within the collection container 400 and is connected to an exterior handle 406. Conveniently, the air filter 404 can be made of any material known in the art to collect particulate matter. In one embodiment, the air filter 404 can trap particulate matter having particle sizes that range from nanometers to millimeters in size. In the embodiment shown the air filter 404 has a pleated profile as clearly seen in FIGS. 11B and 11C, however in alternative embodiments air filter 404 can have any surface profile, for example, an undulating surface, that operates to collect and/or trap particulate matter such that the trapped particulates are fully contained within the collection container 400 and stored for removal. In the embodiment shown, collection container 400 is a sealed container storing particulate matter. In further embodiments of the invention, the collection container 400 can be an open container storing particulate matter.

In further embodiments of the invention, the collection container 400 comprises an exhaust conduit, such as a tube, hose, or pipe, connected to a storage receptacle for storing the particulate matter. The exhaust conduit can serve to connect the storage receptacle to the dust separator 300. In such an embodiment, the exhaust conduit can allow the storage receptacle to be physically positioned such that the storage receptacle's connection to the dust separator 300 is separated by several feet or greater distances. In such an embodiment, the storage receptacle can be either an open container or a sealed container for storing particulate matter. In one embodiment, the collection container 400 can be separated from the particulate or dust separator 300 and portable for use around a job site. In yet another embodiment, the collection container 400 can be separated from the particulate or dust separator 300 and stationary or fixed.

Figure 11A:
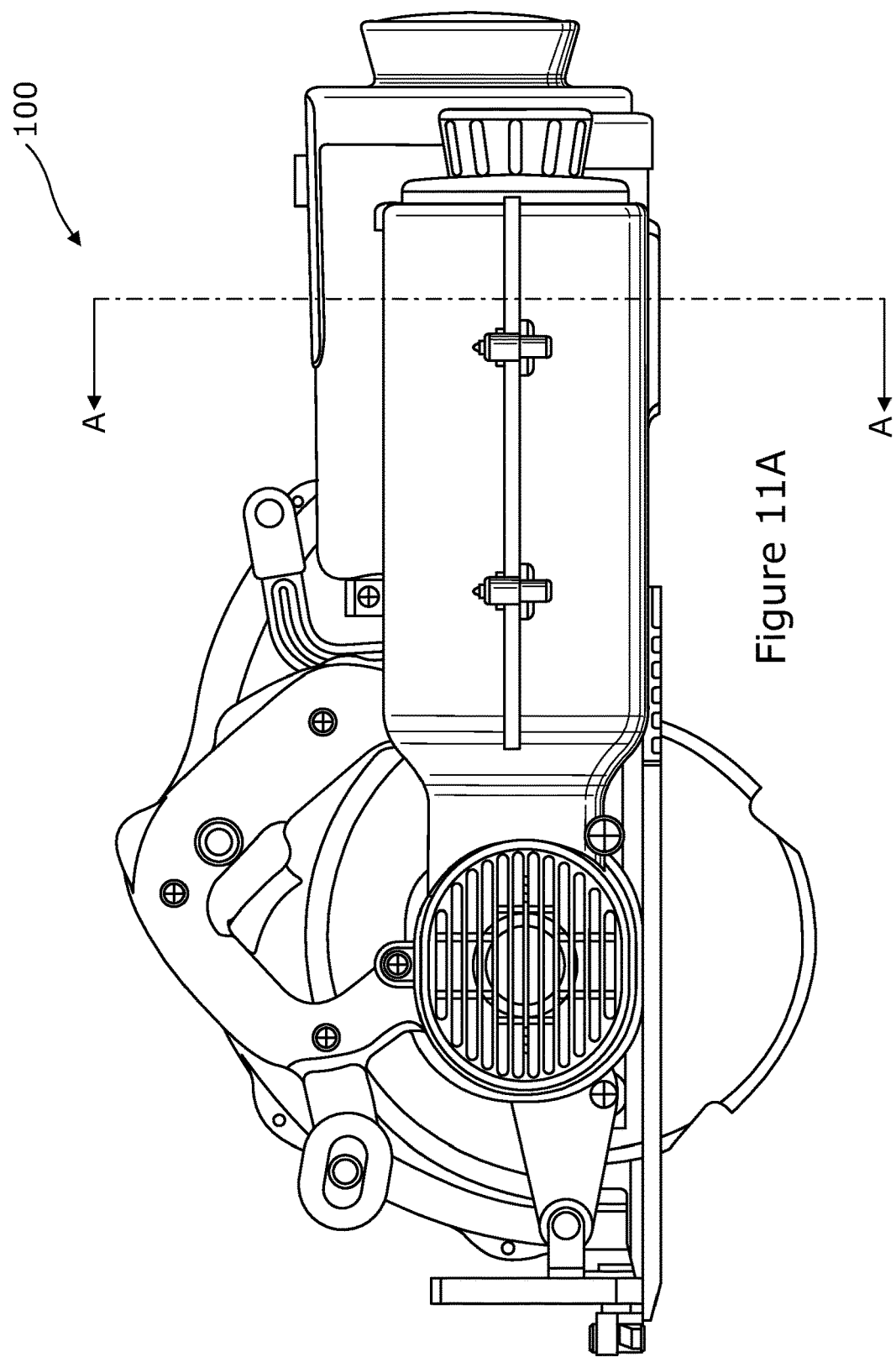
FIG. 11A is a second side view of the cutting apparatus of FIG. 1.
Figure 12:
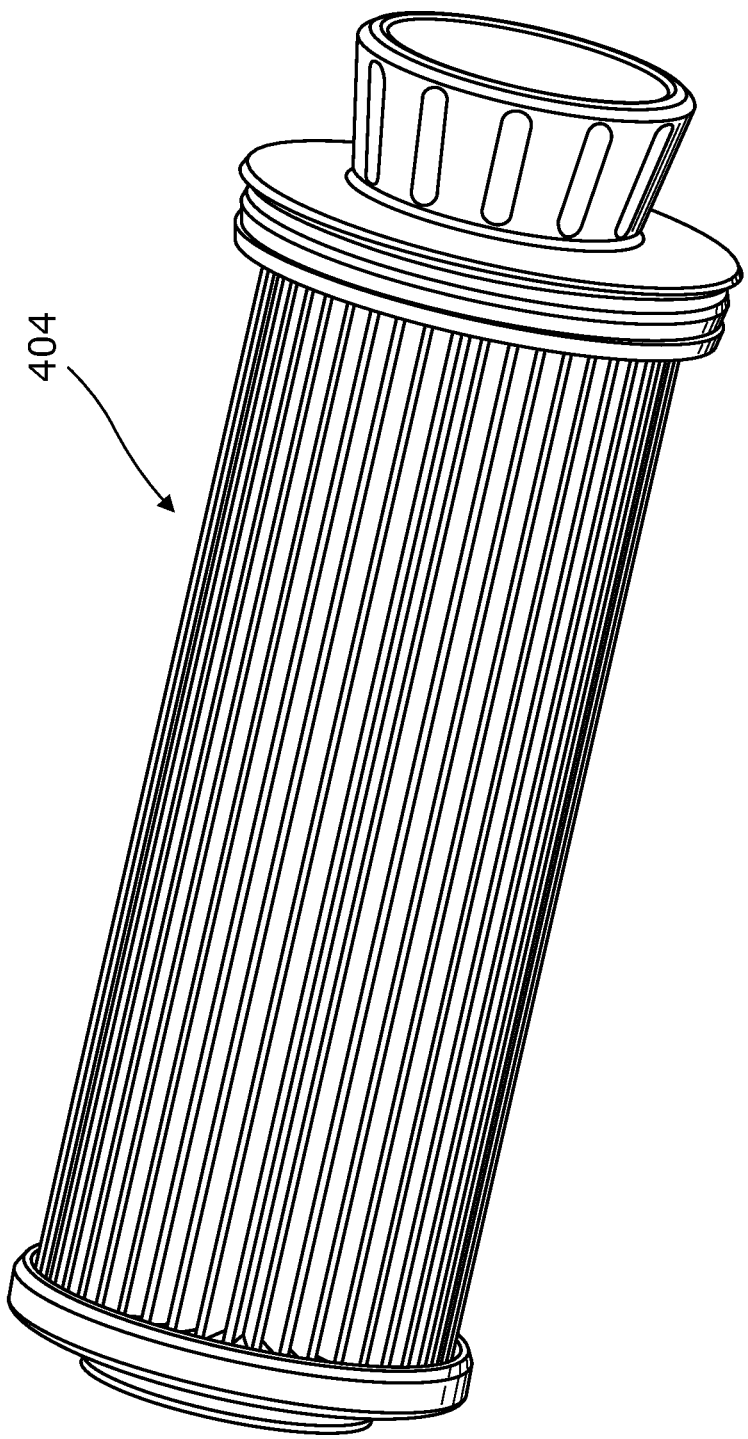
FIG. 12 is a perspective view of an embodiment of the air filter of the cutting apparatus of the invention.

Referring now to FIGS. 11A, 11B, 11C and 12. FIG. 11A, is a side view of the cutting apparatus 100 according to the embodiment of FIG. 1. FIG. 11B depicts a cross-sectional view of the cutting apparatus 100 at section A-A of FIG. 11A, whilst FIG. 11C is an enlarged view of the detail in section C of FIG. 11B. FIG. 12 depicts an embodiment of the pleated air filter 404. In the embodiment shown, the air filtration assembly 402 comprises a pleated filter 404 and a filter cleansing apparatus 408. The filter cleansing apparatus 408 shown clearly in FIG. 11C mechanically agitates the filter against an agitator 410 to disengage collected particulate matter from the air filter 404. In various embodiments, relative linear or rotational motion between the air filter 404 and the agitator 410 can cause the air filter 404 to vibrate and disengage trapped particulate matter. It should be appreciated that either the air filter 404, the agitator 410, or both can be moved.

In one embodiment of the invention, an operator can manually activate the cleansing apparatus 408 by rotating the exterior handle 406. Rotating the exterior handle 406 causes the air filter 404 to rotate and mechanically contact the agitator 410. The mechanical interaction between the agitator 410 and the air filter 404 can cause the air filter 404 to vibrate and disengage the particulate matter. Once disengaged, the air filter 404 can be removed from the collection container 400 and the now disengaged particulates can be disposed. In an alternative embodiment, the agitator 410 can mechanically contact the air filter 404 by using a sliding motion as opposed to a rotation motion. In such an embodiment, the collection container 400 can include an external slide mechanism (not illustrated) which allows the agitator 410 to slide along the longitudinal exterior surface of the air filter 404 for cleaning. It should be appreciated that the agitator 410 can include one or more mechanisms for cleaning the air filter 404. As described above, the air filter 404, the agitator 410, or both can be moved to clean the air filter 404.

In yet further alternative embodiments, the filter cleansing apparatus 408 can optionally include a motor, for example, a servo motor, to rotate and/or translate the agitator 410 the air filter 404 to mechanically contact the agitator 410. In such an embodiment, the motor can be programmed to automatically activate and engage the filter cleansing apparatus 408, e.g. after a set period of time the apparatus has been on, after the operator has completed a cut, or after the air filter 404 senses it is full using an optional sensor. Alternatively, the motor can be connected to a switch, lever, or button allowing the operator to activate the motor to engage the filter cleansing apparatus 408. It should be appreciated that the air filter cleansing apparatus 408 can include manual, electronic and/or automatic cleaning methods.

In yet another embodiment, the cleansing apparatus 408 can include a bristled cleaning tool, such as a brush, to clean the air filter 404. It should be appreciated that a bristled cleaning tool can use one or more of the previously described methods cleaning the air filter 404.

Figure 13A:
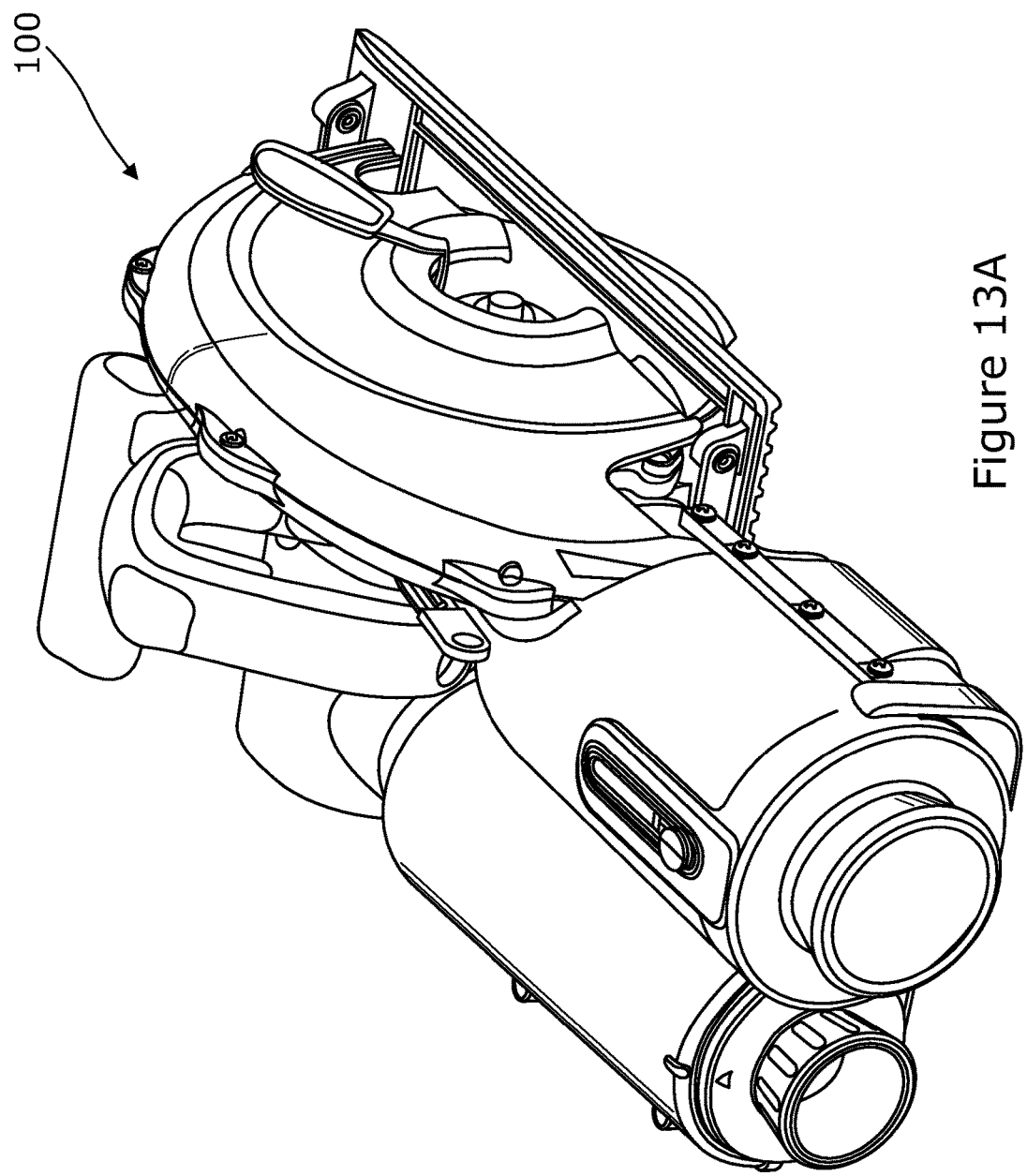
FIGS. 13A, 13B and 13C are alternative perspective views of the cutting apparatus of FIG. 1.
Figure 13B:
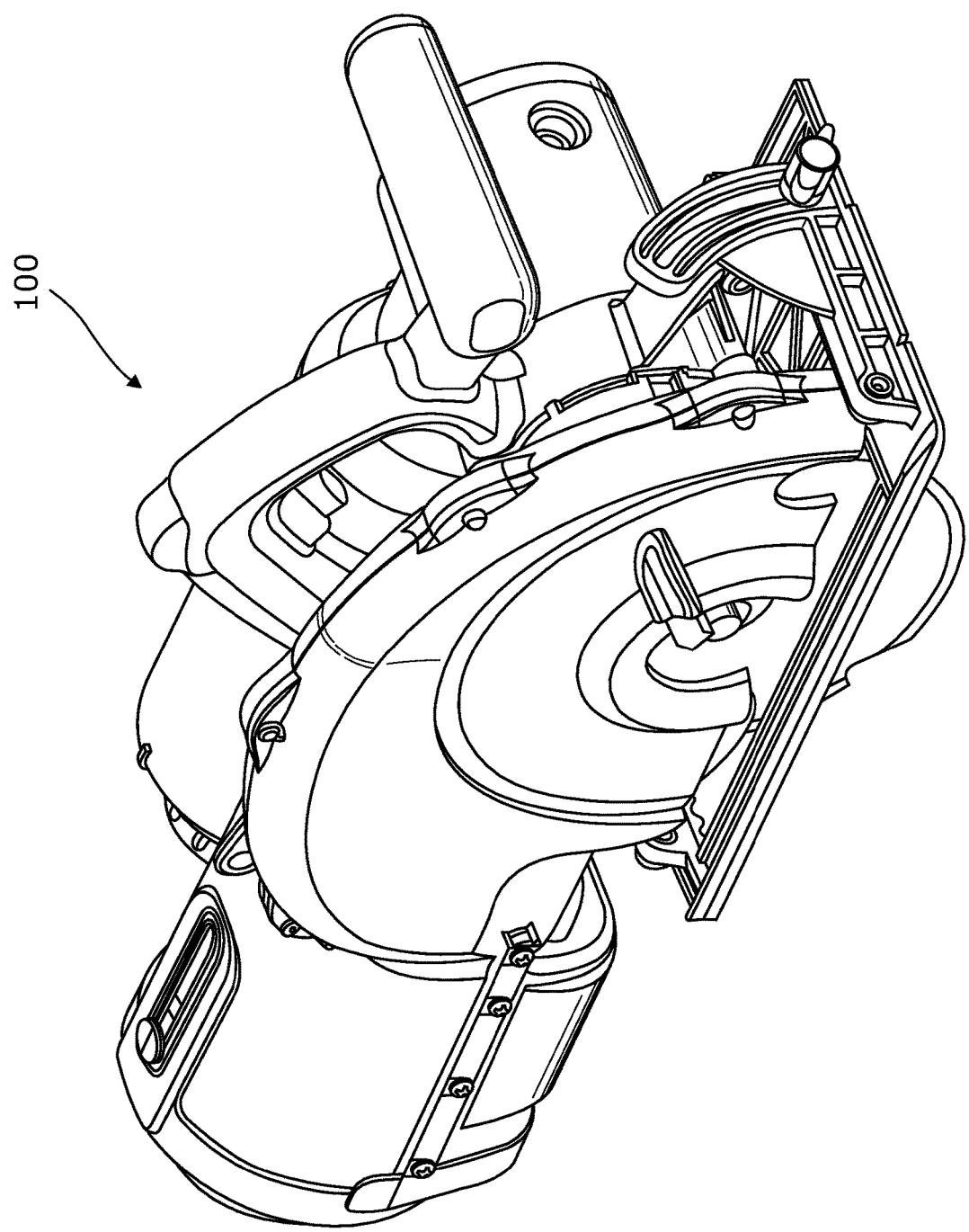
Figure 13C:
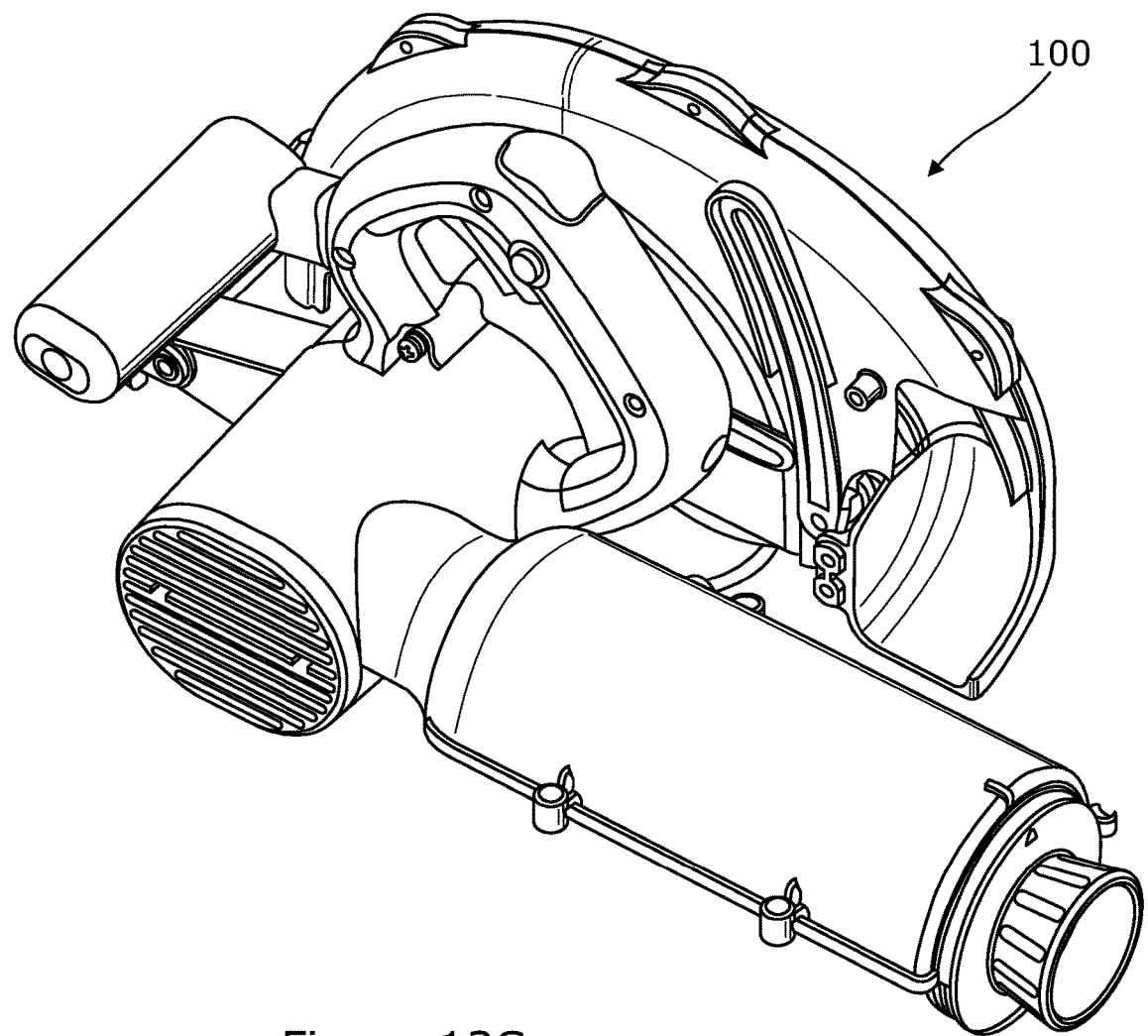

Referring now to FIGS. 13A to 13C, there is shown alternate views of the cutting apparatus of FIG. 1. It is to be understood that the component parts of the cutting apparatus 100 of the invention can be manufactured as a single unit (e.g. to be sold as a new device). In other embodiments of the invention, each of the component parts of the cutting apparatus 100 can be manufactured as a retrofit or add-on kit for use with existing cutting tools. As a retrofit kit, some or all of the following parts can be added on to an existing cutting tool: the upper and lower casings 204, 206, the particulate or dust separator 300, and the collection container 400. It should be appreciated that the retrofit kit can include any of the components listed in the various embodiments.

In one embodiment, a method of collecting particulate matter comprises activating an electric motor to cause the blade to rotate. The rotating blade is cut into the work piece generating particulate matter. The centrifugal forces generated by the rotating blade cause an air stream to enter into the upper casing. Particulate matter generated during the cutting process accompanies the air stream. The particulate matter and the air stream exit the outlet port of the upper casing and enter into the particulate or dust separator. The particulate or dust separator removes the particulate or dust from the air stream and causes the particulate matter to exit the outlet of the particulate or dust separator into the collection container. The air filter inside the collection container captures and traps the particulate matter.

In accordance with one embodiment, a method of collecting particulate matter further comprises separating large and/or heavy particles from the air stream. In such an embodiment, the particulate or dust separator further includes a cylindrical ramp and auxiliary vent, wherein the ramp and vent are located on an internal sidewall of the particulate or dust separator, and the vent is located proximate the cylindrical ramp. In such an embodiment, the vent creates a local negative pressure region when an air stream flows over the vent and causes large and/or heavy particles in the air stream to fall out of the air stream and through the vent. Smaller and/or lighter particles remain with the air stream and exit the outlet of the particulate or dust separator into the collection container. The air filter inside the collection container captures and traps the particulate matter.

In one embodiment, a method of enabling an air stream to enter the upper casing comprises activating an electric motor to cause the blade to rotate. The rotating blade is cut into the work piece generating particulate matter. The centrifugal forces generated by the rotating blade cause an air stream to enter into the upper casing. The lower casing rotates at least partially into the upper casing. The air and particulate matter are carried through the flow diverters of the airfoil of the lower casing into the air chamber of the upper casing.

In one embodiment, a method of cleaning the air filter comprises rotating an exterior handle on the air filter. The air filter is mechanically contacted by an agitator, causing the filter to vibrate. The vibration of the air filter disengages the particulate matter from the air filter. The operator removes the filter assembly from the collection container and disposes of the particulate matter.

In one embodiment, a method of cleaning the air filter comprises moving an exterior slide mechanism longitudinal along the collection container. The air filter is mechanically contacted by an agitator, causing the filter to vibrate. The vibration of the air filter disengages the particulate matter from the air filter. The operator removes the filter assembly from the collection container and safely disposes of the particulate matter.

The cutting tool, including the particulate or dust separator and air filtration apparatus, limit the operator's exposure to dust by collecting and containing the particulate matter while allowing the tool to be portable and handheld during operation. The cutting tool can be used in such industries such as new or rehabilitation construction, allowing the operator to be mobile such that the operator can use the tool at various locales in the work site.

In accordance with one embodiment, a kit for retrofitting existing circular saws comprises upper and lower casings, a particulate or dust separator, and a collection container. The upper casing has an air chamber configured to divert particulate matter generated during use of the cutting tool, and the upper casing and the particulate or dust separator are in communication such that particulate matter generated during the use of the cutting tool can be directed from the upper casing into the particulate or dust separator. The particulate or dust separator removes the dust from the air stream and causes the particulate matter to exit the outlet of the particulate or dust separator into the collection container. The air filter inside the collection container captures and traps the particulate matter.

Figure 14A:
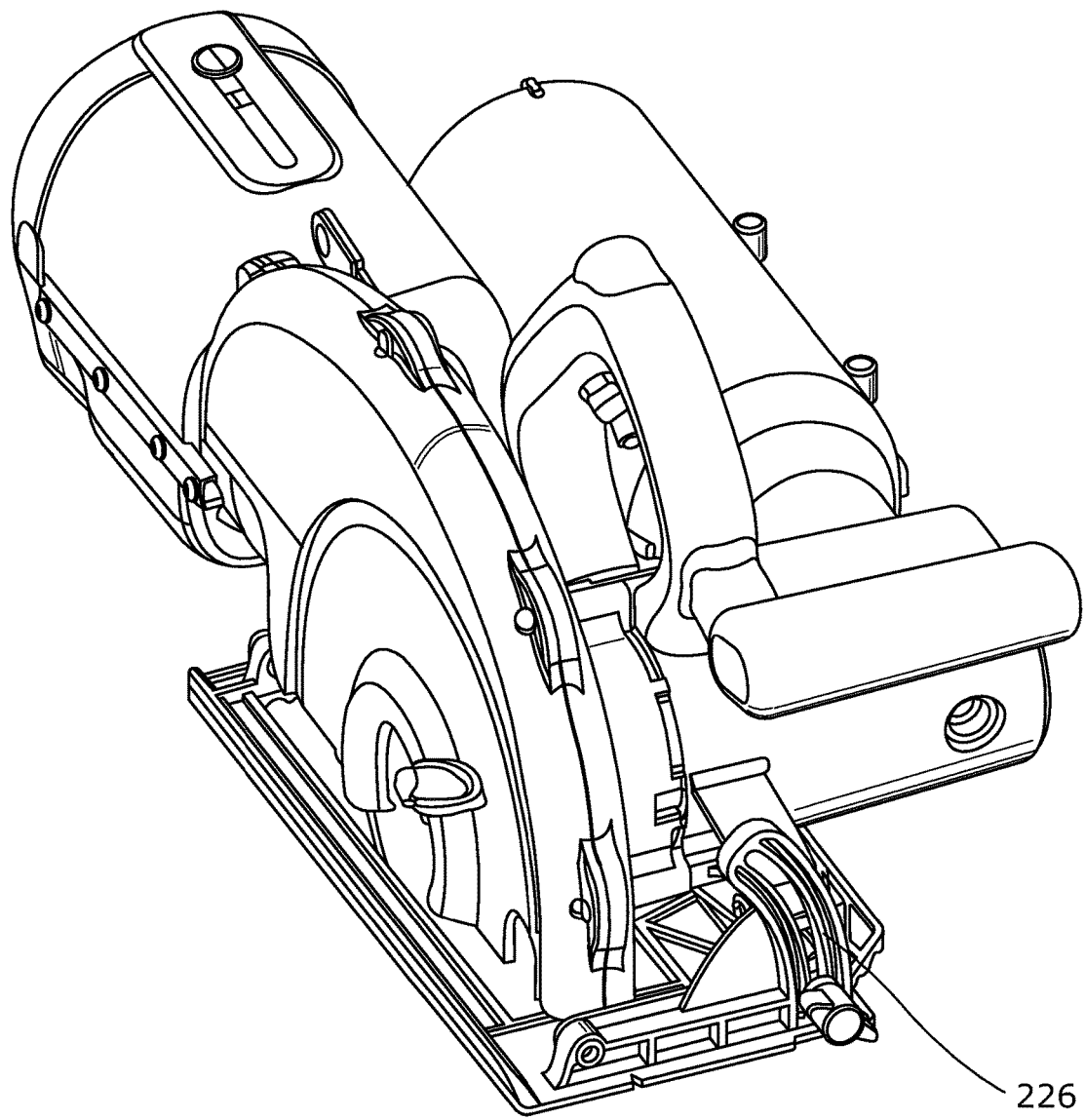
FIGS. 14A and 14B are perspective views of alternative embodiments of the cutting apparatus of the invention.
Figure 14B:
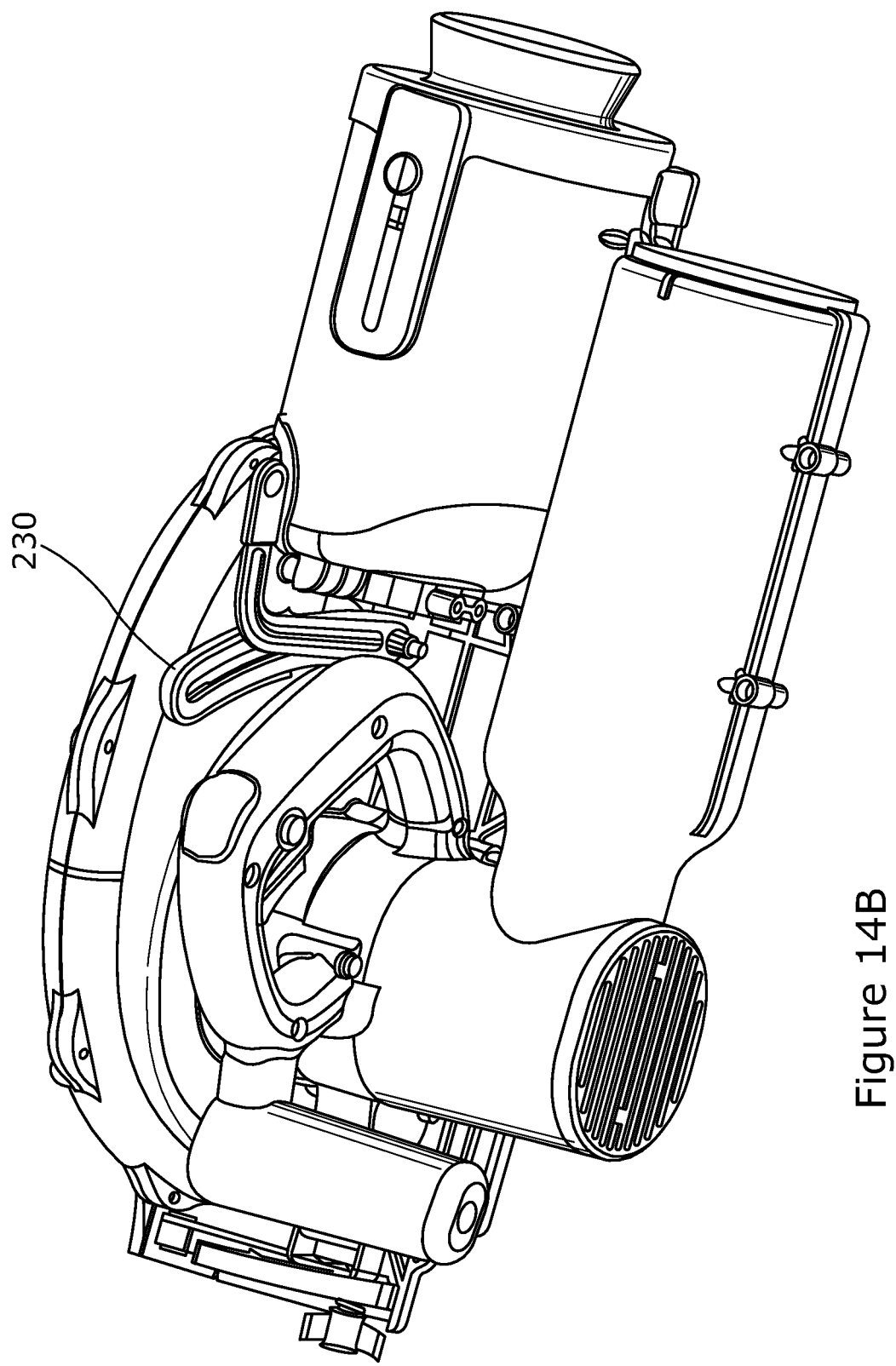

FIG. 14A depicts an alternative embodiment of the cutting apparatus. As depicted in FIG. 14A, the cutting tool can include a miter adjustment member 226. The miter adjustment member 226 allows the blade 202 to be oriented in an angled configuration relative to the work piece in order to create miter cuts. FIG. 14B depicts an alternative embodiment of the cutting apparatus. As depicted in FIG. 14B, the cutting apparatus can be adjusted by a vertical adjustment member 230 to allow for variable depth cuts of the work piece.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Additionally, the skilled artisan will recognize that any of the above-described methods can be carried out using any appropriate apparatus. Further, the disclosure herein of any particular feature, aspect, method, property, characteristic, quality, attribute, element, or the like in connection with an embodiment can be used in all other embodiments set forth herein. For all of the embodiments described herein the steps of the methods need not be performed sequentially. Thus, it is intended that the scope of the present invention herein disclosed should not be limited by the particular disclosed embodiments described above.

The invention claimed is:

1. A cutting apparatus comprising a cutting tool, wherein the cutting tool comprises cutting means coupled to an output drive shaft of a drive mechanism operable to drive the cutting means; and
   a collection assembly, wherein the collection assembly comprises a casing which accommodates at least a portion of the cutting means, the casing further comprising a chamber for collecting matter generated by the cutting means wherein the chamber comprises an inlet, an outlet and a conduit intermediate the inlet and the outlet;
   wherein the casing further comprises a plurality of airfoil sections spaced radially about the cutting means, the airfoil sections configured to direct air and particulate matter therebetween from the cutting means into the conduit, each airfoil section comprising a substantially planar surface extending across an interior space within the casing and disposed perpendicular to a plane defined by the cutting means.

2. A cutting apparatus as claimed in claim 1, wherein the conduit comprises a channel.

3. A cutting apparatus as claimed in claim 2, wherein the conduit comprises an open channel, wherein the conduit of the cutting tool is located adjacent the at least a portion of the cutting means seated within the casing.

4. A cutting apparatus as claimed in claim 2, wherein the conduit comprises an enclosed channel, wherein the casing comprises a wall intermediate the channel and the at least a portion of the cutting means seated within the casing.

5. A cutting apparatus as claimed in claim 4, wherein the wall intermediate the channel and the at least a portion of the cutting means seated within the casing comprises one or more openings.

6. A cutting apparatus as claimed in claim 1, wherein the chamber of the casing has a variable internal diameter extending substantially along a longitudinal axis of the casing between a front end of the casing and a rear end of the casing.

7. A cutting apparatus as claimed in claim 1, wherein the casing comprises at least two casing sections positioned adjacent the cutting means, wherein each casing section is configured to accommodate at least a portion of the cutting means.

8. A cutting apparatus as claimed in claim 7, wherein the at least two casing sections are an upper casing section and a lower casing section.

9. A cutting apparatus as claimed in claim 8, wherein the lower casing is moveable between a first and second position whereby the cutting edge of the cutting means is covered when the or each casing is in the first position and whereby the cutting edge of the cutting means is exposed for use in the second position.

10. A cutting apparatus as claimed in claim 8, wherein the lower casing is moveable between a first position and a second position wherein in the second position the lower casing is seated within the upper casing.

11. A cutting apparatus as claimed in claim 8, wherein the lower casing is configured to accommodate at least a portion of the cutting means such that the at least a portion of the cutting means is seated within the casing whereby the distance between the cutting edge of the cutting means and a radially inward facing surface of the lower casing is approximately 0.25" (0.64 cm)±0.125" (0.318 cm).

12. A cutting apparatus as claimed in claim 1, wherein the cutting apparatus further comprises a particulate matter separator.

13. A cutting apparatus as claimed in claim 12, wherein the particulate matter separator comprises a ramp and an auxiliary vent.

14. A cutting apparatus as claimed in claim 13, wherein the auxiliary vent is located on a side wall of the particulate matter separator.

15. A cutting apparatus as claimed in claim 1, wherein the cutting apparatus further comprises a collection container.

16. A cutting apparatus as claimed in claim 15, wherein the collection container comprises an air filtration assembly.

17. A cutting apparatus as claimed in claim 1, wherein the casing comprises an upper casing section, the upper casing section having a chamber configured to divert particulate matter generated by the cutting means, and a particulate matter separator, wherein the upper casing section and the particulate matter separator are in communication such that particulate matter generated by the cutting means can be directed from the upper casing section into the particulate matter separator.

18. A cutting apparatus as claimed in claim 1, wherein the casing comprises an upper casing section and a lower casing section, the upper casing sections having a chamber configured to divert particulate matter generated by the cutting means, and a particulate matter separator, wherein the upper casing section and the particulate matter separator are in communication such that particulate matter generated by the cutting means can be directed from the upper casing section into the particulate matter separator.

19. A cutting apparatus as claimed in claim 1, wherein the casing comprises an upper casing section and a lower casing section, the upper and lower casing sections each having a chamber configured to divert particulate matter generated by the cutting means; and a particulate matter separator, wherein the upper casing section and the particulate matter separator are in communication such that particulate matter generated by the cutting means can be directed from the upper and lower casing sections into the particulate matter separator.

20. A cutting apparatus as claimed in claim 1, wherein the cutting means comprises a cutting edge.

21. A cutting apparatus as claimed in claim 8, wherein the cutting means comprises a cutting edge and the lower casing is removable from around the cutting means to expose the cutting edge of the cutting means.

22. A cutting apparatus as claimed in claim 1, wherein the casing is a blade guard assembly.

23. A cutting apparatus as claimed in claim 1, wherein the output drive shaft of the drive mechanism operable to drive the cutting means, comprises a rotary drive shaft and the cutting means is a circular blade.

24. A cutting apparatus as claimed in claim 1, wherein the output drive shaft of the drive mechanism operable to drive the cutting means, comprises a reciprocating drive shaft and the cutting means is a linear blade.

25. A cutting apparatus as claimed in claim 1, wherein the cutting tool of the cutting apparatus is a portable circular saw.

* * * * *